US010563541B2

(12) United States Patent
Shirota et al.

(10) Patent No.: US 10,563,541 B2
(45) Date of Patent: Feb. 18, 2020

(54) SECURING DEVICE, STEAM TURBINE, AND ROTARY MACHINE MANUFACTURING METHOD AND ASSEMBLY METHOD

(71) Applicant: MITSUBISHI HITACHI POWER SYSTEMS, LTD., Yokohama-shi, Kanagawa (JP)

(72) Inventors: Akihiko Shirota, Kanagawa (JP); Taichi Ozaki, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/560,284

(22) PCT Filed: Mar. 22, 2016

(86) PCT No.: PCT/JP2016/059019
§ 371 (c)(1),
(2) Date: Sep. 21, 2017

(87) PCT Pub. No.: WO2016/152866
PCT Pub. Date: Sep. 29, 2016

(65) Prior Publication Data
US 2018/0073397 A1 Mar. 15, 2018

(30) Foreign Application Priority Data
Mar. 26, 2015 (JP) .................. 2015-065256

(51) Int. Cl.
*F01D 25/26* (2006.01)
*F16B 13/08* (2006.01)
*F16B 19/02* (2006.01)

(52) U.S. Cl.
CPC ........ *F01D 25/265* (2013.01); *F16B 13/0858* (2013.01); *F16B 19/02* (2013.01);
(Continued)

(58) Field of Classification Search
CPC ............. F05D 2220/40; F05D 2260/36; F05D 2230/60; F05D 2220/31; F05D 2230/64
See application file for complete search history.

(56) References Cited

U.S. PATENT DOCUMENTS 3,318,513 A * 5/1967 Johnson ................ F01D 17/162
415/161
5,672,047 A * 9/1997 Birkholz ................ F01D 9/065
415/160
(Continued)

FOREIGN PATENT DOCUMENTS

JP 2004-162536 A 6/2004
JP 2010-121498 A 6/2010
(Continued)

OTHER PUBLICATIONS

Office Action dated Nov. 29, 2019, issued in counterpart IN application No. 201747033586, with English translation. (6 pages).

*Primary Examiner* — Long T Tran
(74) *Attorney, Agent, or Firm* — Westerman, Hattori, Daniels & Adrian, LLP

(57) ABSTRACT

A securing device having a radial pin which is inserted into a through-hole having an outside hole and an inside hole and penetrating an outside member in the radial direction of a rotary machine, the outside hole being open to the outside of the outside member in the radial direction of the rotary machine, the inside hole communicating with the outside hole, having a smaller diameter than the outside hole, and being open to the inside in the radial direction of the rotary machine, the radial pin having a portion on the inside in the radial direction of the rotary machine inserted into a recess formed in an inside member, and including a flange portion having an outer diameter larger than a diameter of the inside
(Continued)

hole; and a pin support unit which is inserted into the outside hole on the outside in the radial direction of the rotary machine.

25 Claims, 14 Drawing Sheets

(52) U.S. Cl.
CPC ...... *F05D 2220/31* (2013.01); *F05D 2230/60* (2013.01); *F05D 2240/14* (2013.01)

(56) References Cited

U.S. PATENT DOCUMENTS

| | | | |
|---|---|---|---|
| 6,364,606 B1 * | 4/2002 | Rice | F01D 25/246 415/189 |
| 6,401,447 B1 * | 6/2002 | Rice | F23M 5/04 60/751 |
| 2007/0119182 A1 * | 5/2007 | Czachor | F01D 25/28 60/796 |
| 2010/0061844 A1 * | 3/2010 | Hudson | F01D 9/042 415/189 |
| 2012/0099990 A1 | 4/2012 | Fretwell | |
| 2013/0259646 A1 * | 10/2013 | Feindel | F01D 21/003 415/118 |
| 2013/0336784 A1 | 12/2013 | Sankolli et al. | |

FOREIGN PATENT DOCUMENTS

| | | |
|---|---|---|
| JP | 2013-257040 A | 12/2013 |
| JP | 2014-066174 A | 4/2014 |

\* cited by examiner

SECURING DEVICE, STEAM TURBINE, AND ROTARY MACHINE MANUFACTURING METHOD AND ASSEMBLY METHOD

TECHNICAL FIELD

The present invention relates to a securing device which secures a relative position in a rotation direction of two members on a stationary side of a rotary machine, a steam turbine having the securing device, a rotary machine manufacturing method, and a rotary machine assembly method.

BACKGROUND ART

As a rotary machine, there is a steam turbine, a gas turbine, a compressor, or the like. For example, a steam turbine includes an outer casing, an inner casing which is provided inside the outer casing, a rotor which is inserted into the inner casing, a plurality of blades which are disposed in multiple stages on the rotor, and a plurality of vanes which are disposed in multiple stages in the inner casing. The blades and the vanes of the multiple stages are alternately disposed in an axial direction of the rotor. In the steam turbine, steam enters the inner casing and is supplied to a space in which the blades and the vanes of multiple stages are disposed, and thus, the rotor is rotated via the blades of multiple stages, and a generator connected to the rotor is driven.

Here, various devices are provided in the rotary machine to secure a relative position of stationary side (secured side) members (stationary bodies) which include the outer casing, the inner casing, and the vanes in a rotation direction, an axial direction, a horizontal direction, or the like of the rotary machine. For example, as the device which secures the relative position of the stationary side members in the rotation direction of the rotary machine, PTL 1 discloses a device which secures a relative position of a blade ring supporting vanes and an inner casing supporting the blade ring. The device disclosed in PTL 1 includes a radial pin (eccentric pin) which is inserted into a hole formed in the inner casing and which has a tip inserted into a recess formed in the blade ring. The radial pin is secured to the inner casing by being secured to the inner casing by using a pin. In addition, in the device disclosed in PTL 1, a lid is provided on the outside of the radial pin in the radial direction of the rotary machine, and the lid is secured to an outer casing by bolts.

CITATION LIST

Patent Literature

[PTL 1] Japanese Unexamined Patent Application Publication No. 2004-162536

SUMMARY OF INVENTION

Technical Problem

In the securing device of PTL 1, by disposing the lid on the outside of the radial pin in the radial direction of the rotary machine and securing the lid to the casing using bolts, the radial pin is restrained from moving toward the outside in the radial direction of the rotary machine. In the case of this structure, since a force which moves the lid toward the outside in the radial direction of the rotary machine is applied from the radial pin to the lid, it is necessary to increase a size of a fastening member such as a bolt for fastening the lid, and there is no choice but to increase the size of the lid. That is, it is difficult to decrease the size of the member which restrains the radial pin from moving toward the outside in the radial direction of the rotary machine.

The present invention is made to solve the above-described problems, and an object thereof is to provide a securing device capable of preventing a radial pin inserted into an outside member and an inside member from moving toward the outside in the radial direction of the rotary machine and having a simple structure, a steam turbine, a rotary machine manufacturing method, and a rotary machine assembly method.

Solution to Problem

In order to achieve the above-described object, according to the present invention, there is provided a securing device which secures a relative position in a circumferential direction of an outside member and an inside member of a stationary body of a rotary machine, the securing device including: a radial pin which is inserted into a through-hole having an outside hole and an inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, the radial pin having a portion on the inside in the radial direction of the rotary machine inserted into a recess formed in the inside member, and including a flange portion having an outer diameter larger than a diameter of the inside hole; and a pin support unit which is inserted into the outside hole on the outside in the radial direction of the rotary machine, and is configured such that a surface formed on the outside in the radial direction of the rotary machine overlaps, in a radial direction of the through-hole, a surface which is formed on the outside hole and faces the inside in the radial direction of the rotary machine, and such that the pin support unit overlaps the radial pin in the radial direction of the through-hole.

In addition, preferably, the pin support unit includes a support sleeve having a surface formed on the outside in the radial direction of the rotary machine, and a spacer which is disposed inside the support sleeve and is in contact with an inner peripheral surface of the support sleeve.

Moreover, preferably, a support unit insertion groove recessed in a radial direction of the outside hole is formed in an inner peripheral surface of the outside hole, a surface facing the inside in the radial direction of the rotary machine is formed on the outside of the support unit insertion groove in the radial direction of the rotary machine, the surface facing the inside in the radial direction of the rotary machine is in contact with the surface of the support sleeve formed on the outside in the radial direction of the rotary machine, and the outer peripheral surface of the support sleeve is in contact with the support unit insertion groove.

In addition, preferably, the support sleeve includes a plurality of split sleeves which are divided in a circumferential direction of the through-hole.

Moreover, preferably, the support sleeve has a cylindrical shape in which slits are formed, and the spacer has a shape in which a diameter of the spacer gradually decreases from the outside in the radial direction of the rotary machine toward the inside in the radial direction thereof.

In addition, preferably, the slits are formed in the radial direction of the rotary machine from an end surface of the support sleeve on the outside in the radial direction of the rotary machine or an end surface of the support sleeve on the inside in the radial direction thereof.

Moreover, preferably, the securing device further includes a cover member which is disposed on the outside of the pin support unit in the radial direction of the rotary machine and is secured to the outside member.

In addition, preferably, the outer peripheral surface of the support sleeve is perpendicular to the surface of the outside hole facing the inside in the radial direction of the rotary machine.

Moreover, preferably, the securing device further includes a liner which is disposed between the pin support unit and the radial pin and is in contact with the pin support unit.

In addition, preferably, in the support unit insertion groove, a surface which is in contact with the outer peripheral surface of the support sleeve and is perpendicular to the radial direction of the outside hole and a surface which faces the surface facing the inside in the radial direction of the rotary machine are formed.

In addition, preferably, in the support unit insertion groove, a surface which is in contact with the outer peripheral surface of the support sleeve and extends farther toward the inside in the radial direction of the outside hole as the surface extends from the outside in the radial direction of the rotary machine toward the inside in the radial direction thereof is formed.

Moreover, preferably, the securing device further includes a seal unit which is inserted into the through-hole and seals the through-hole on the inside of the pin support unit in the radial direction of the rotary machine.

In addition, preferably, the seal unit includes a seal sleeve in which a diameter of an inner peripheral surface is changed in the radial direction of the rotary machine and a columnar insertion member which is inserted into the seal sleeve and is in contact with the inner peripheral surface of the seal sleeve, and an outer peripheral surface of the seal sleeve is in contact with the through-hole and the inner peripheral surface of the seal sleeve and the insertion member are in contact with each other.

In order to achieve the above-described object of the present invention, according to the present invention, there is provided a steam turbine, including: any one of the above-described securing devices; the outside member; the inside member; and a rotary body which is disposed on the inside of the inside member in the radial direction of the rotary machine.

In order to achieve the object of the present invention, according to the present invention, there is provided a rotary machine manufacturing method for manufacturing a rotary machine by securing a relative position in a circumferential direction of an outside member and an inside member of a stationary body of the rotary machine, the method including: a step of inserting a radial pin including a flange portion having an outer diameter larger than a diameter of an inside hole into a through-hole having an outside hole and the inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, and of inserting an end portion of the radial pin on the inside in the radial direction of the rotary machine into a recess which is formed in the inside member disposed on the inside of the outside member in the radial direction of the rotary machine; and a pin support unit installation step of inserting a pin support unit into the outside hole on the outside in the radial direction of the rotary machine, causing the pin support unit and the radial pin to overlap each other in a radial direction of the through-hole, and causing a surface of the pin support unit formed on the outside in the radial direction of the rotary machine and a surface which is formed on the outside hole and faces the inside in the radial direction of the rotary machine to overlap each other in the radial direction of the through-hole.

In addition, preferably, the pin support unit includes a support sleeve having a surface formed on the outside in the radial direction of the rotary machine and a spacer which is inserted into the support sleeve, and the pin support unit installation step includes a step of disposing a surface of the support sleeve formed on the outside in the radial direction of the rotary machine at a position at which the surface is in contact with the surface of the outside hole facing the inside in the radial direction of the rotary machine, and a step of inserting the spacer into the support sleeve.

Moreover, preferably, the pin support unit includes a support sleeve having a surface formed on the outside in the radial direction of the rotary machine and a spacer which is inserted into the support sleeve, and the pin support unit installation step includes a step of disposing the support sleeve in the outside hole, and a step of inserting the spacer into the support sleeve, moving the support sleeve to the outside in the radial direction of the through-hole, and moving a surface of the support sleeve formed on the outside in the radial direction of the rotary machine to a position at which the surface is in contact with the surface of the outside hole facing the inside in the radial direction of the rotary machine.

In order to achieve the above-described object of the present invention, according to the present invention, there is provided a rotary machine assembly method for manufacturing a rotary machine by securing a relative position in a circumferential direction of an outside member and an inside member of a stationary body of the rotary machine, the method including: a step of inserting a radial pin including a flange portion having an outer diameter larger than a diameter of an inside hole into a through-hole having an outside hole and the inside hole and penetrating the outside member in a radial direction of the rotary machine, the outside hole being open to an outside the outside member in the radial direction of the rotary machine, the inside hole communicating with the outside hole, having a smaller diameter than the outside hole, and being open to an inside in the radial direction of the rotary machine, and of inserting an end portion of the radial pin on the inside in the radial direction of the rotary machine into a recess which is formed in the inside member disposed on the inside of the outside member in the radial direction of the rotary machine; and a pin support unit installation step of inserting a pin support unit into the outside hole on the outside in the radial direction of the rotary machine, causing the pin support unit and the radial pin to overlap each other in a radial direction of the through-hole, and causing a surface of the pin support unit formed on the outside in the radial direction of the rotary machine and a surface which is formed on the outside hole and faces the inside in the radial direction of the rotary machine to overlap each other in the radial direction of the through-hole.

Advantageous Effects of Invention

According to the present invention, since the pin support unit is provided, it is possible to prevent the radial pin inserted into the outside member and the inside member from moving toward the outside in the radial direction of the rotary machine and it is possible to simplify the structure.

DESCRIPTION OF EMBODIMENTS

Hereinafter, a preferred embodiment of the present invention will be described in detail with reference to the accompanying drawings. However, the present invention is not limited to the embodiment, and in a case where a plurality of embodiments are provided, the present invention also includes configurations obtained by combining the embodiments. For example, in the present embodiment, a case where a rotary machine is a steam turbine is described. However, the present invention is not limited to this. The rotary machine may be a gas turbine, a compressor, or the like. A securing device can be used in various locations where parts of a stationary portion (a portion which does not rotate) of the rotary machine are required to be secured to each other. The securing device can be applied to members which are disposed in a positional relationship of an outside and an inside in a radial direction of a stationary body of the rotary machine such as an outer casing, an inner casing, a blade ring, and a dummy ring of a steam turbine, or a blade ring and a casing of a compressor of a gas turbine.

Figure 1:
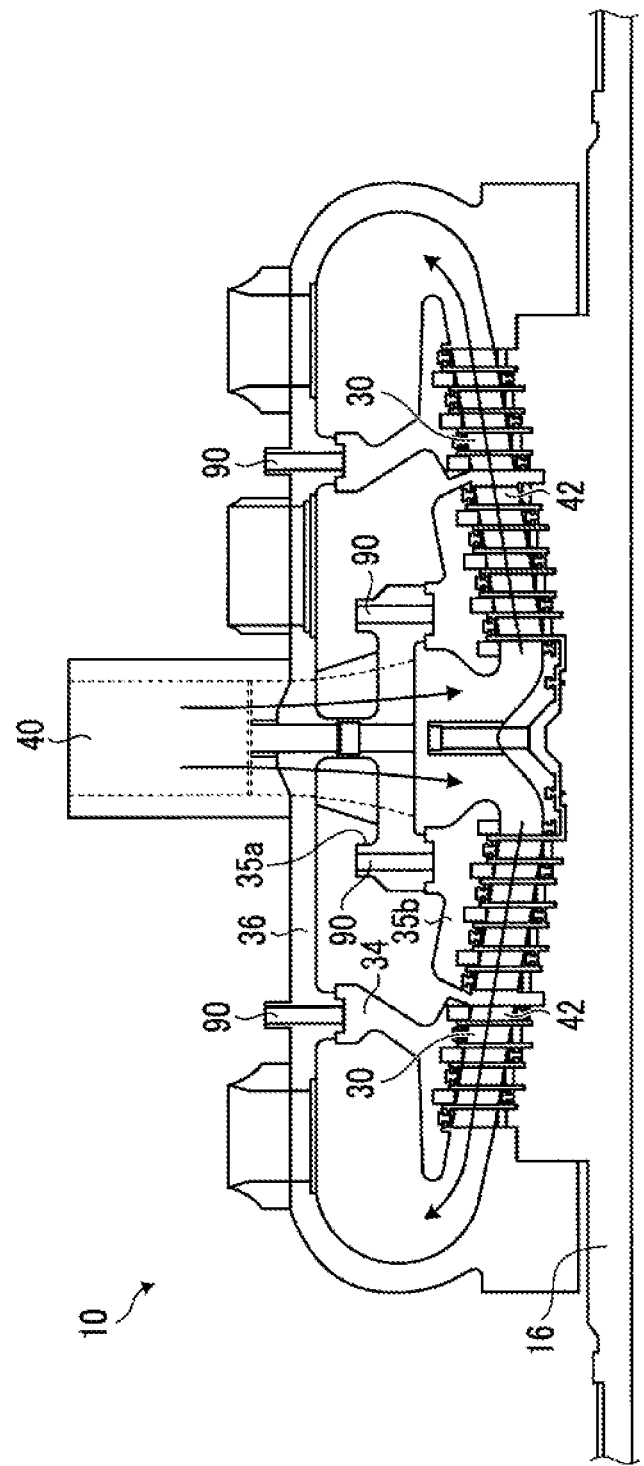
FIG. 1 is a partial sectional view showing a schematic configuration of a steam turbine having a securing device according to an embodiment of the present invention.

FIG. 1 is a partial sectional view showing a schematic configuration of a steam turbine having a securing device according to an embodiment of the present invention. In a steam turbine 10 shown in FIG. 1, steam is supplied from a center side in an axial direction of the steam turbine 10, and the steam flows toward each of both ends in the axial direction and is discharged from both ends in the axial direction to the outside. The steam turbine 10 includes a rotor 16, a plurality of blades 30 which are connected to the rotor 16, an inner casing 34 which is disposed on the outer peripheries of the blades 30, an outer casing 36 which is disposed outside the inner casing 34, a steam inlet 40 through which steam is supplied to the inner casing 34, and a plurality of vanes 42 which are disposed inside the inner casing 34. In the steam turbine 10, the plurality of blades 30 connected to the rotor 16 and the plurality of vanes 42 disposed inside the inner casing 34 are alternately disposed. Moreover, in some cases, the inner casing 34 is separated into an outside member 35a secured to the outer casing 36 and an inside member 35b connected to the vanes 42. In addition, the outside member 35a is also referred to as an inner casing and the inside member 35b is also referred to as a blade ring. In the steam turbine 10, a securing device 90 is provided in each of a connection portion between the inner casing 34 and the outer casing 36 and a connection portion between the inside member 35b and the outside member 35a.

In the steam turbine 10, steam supplied from the steam inlet 40 passes through a region in which the blades 30 and the vanes 42 are alternately disposed between the inner casing 34 and the rotor 16. In the steam turbine 10, the blades 30 are rotated by the force of the steam passing through the region, and thus, the rotor 16 rotates.

Figure 2:
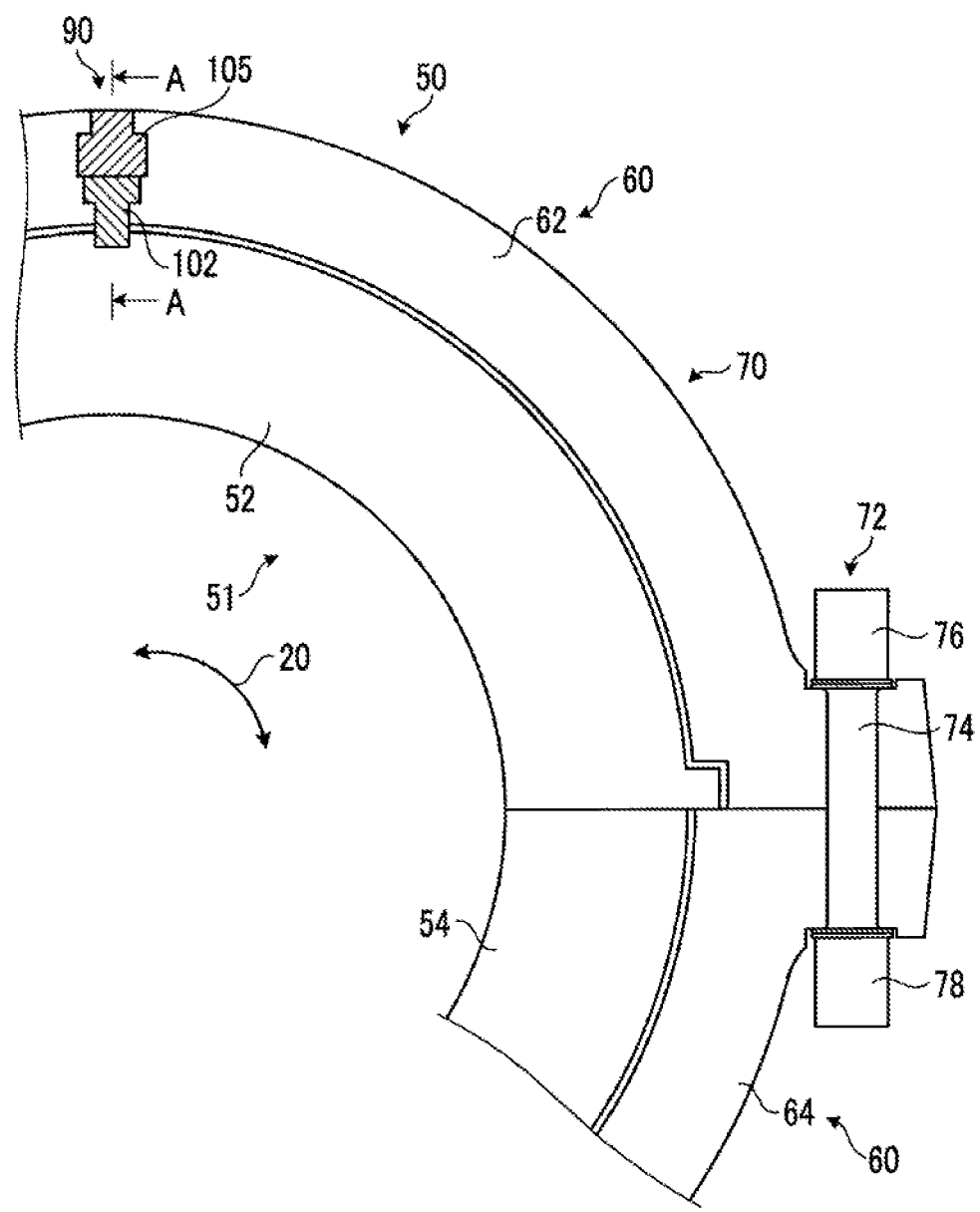
FIG. 2 is a sectional view conceptually showing a securing unit of the steam turbine shown in FIG. 1.

Next, a securing unit 70 including the securing device 90 will be described using FIG. 2. FIG. 2 is a sectional view conceptually showing the securing unit of the steam turbine shown in FIG. 1. Two members of a stationary portion secured by the securing device 90 are collectively referred to as an annular member 50. The annular member 50 includes an inside member 51 and an outside member 60. The inside member 51 and the outside member 60 are annular members and the inside member 51 is disposed inside the outside member 60. Here, in the case of the securing device 90 which secures the inner casing 34 and the outer casing 36, the inside member 51 corresponds to the inner casing 34 and the outside member 60 corresponds to the outer casing 36. In the case of the securing device 90 which secures the inside member 35b and the outside member 35a of the inner casing 34, the inside member 51 corresponds to the inside member 35b and the outside member 60 corresponds to the outside member 35a.

The inside member 51 includes an inside member upper half 52 and an inside member lower half 54. In the inside member 51, an end surface of the inside member upper half 52 in a circumferential direction (rotation direction) 20 and an end surface of the inside member lower half 54 in the circumferential direction (rotation direction) 20 are in contact with each other, that is, in the inside member 51, division surfaces of the inside member upper half 52 and the inside member lower half 54 are in contact with each other. Here, a side surface is a surface which is visible when the steam turbine 10 is viewed in a vertical direction. The outside member 60 includes an outside member upper half 62 and an outside member lower half 64. In the outside member 60, a flange provided on the side surface of the outside member upper half 62 and a flange provided on the side surface of the outside member lower half 64 are in contact with each other.

The securing unit 70 including the securing device 90 secures the inside member 51 and the outside member 60. That is, the securing unit 70 secures the inside member 51 and the outside member 60 such that a relative position thereof is not changed. The securing unit 70 includes an outside member securing device 72 and the securing device 90. In addition, the securing unit 70 may further include a device which secures the upper half and the lower half of the inside member or a device which adjusts a relative position thereof.

The outside member securing device 72 secures the outside member upper half 62 and the outside member lower half 64. The outside member securing device 72 consists of a screw 74 which is inserted into the flanges at which the outside member upper half 62 and the outside member lower half 64 come into contact, and nuts 76 and 78 which are screwed to the screw 74. By squeezing and tightening the screw 74 inserted into the flanges by the nuts 76 and 78, the outside member securing device 72 fastens the outside member upper half 62 and the outside member lower half 64.

The securing device 90 secures a relative position of the inside member 51 and the outside member 60 in the rotation direction of the rotor 16. That is, the securing device 90 prevents the outside member 60 from rotating with respect to the inside member 51 and prevents the inside member 51 from rotating with respect to the outside member 60. The securing device 90 is inserted into a through-hole 66 formed in the outside member upper half 62 and into a recess 56 which is formed in the inside member upper half 52 at a position visible when viewed from the outside of the through-hole 66. The recess 56 is formed in a portion in the rotation direction. Since the securing device 90 is inserted into the through-hole 66 and the recess 56, in a case where a force which relatively rotates the inside member 51 and the outside member 60 in the rotation direction of the rotor 16 is applied to the inside member 51 and the outside member 60, the surface of the end of the securing device 90 in the rotation direction comes into contact with the through-hole 66 and the recess 56. Accordingly, the securing device 90 prevents the inside member 51 and the outside member 60 from relatively rotating in the rotation direction of the rotor 16.

Figure 3:
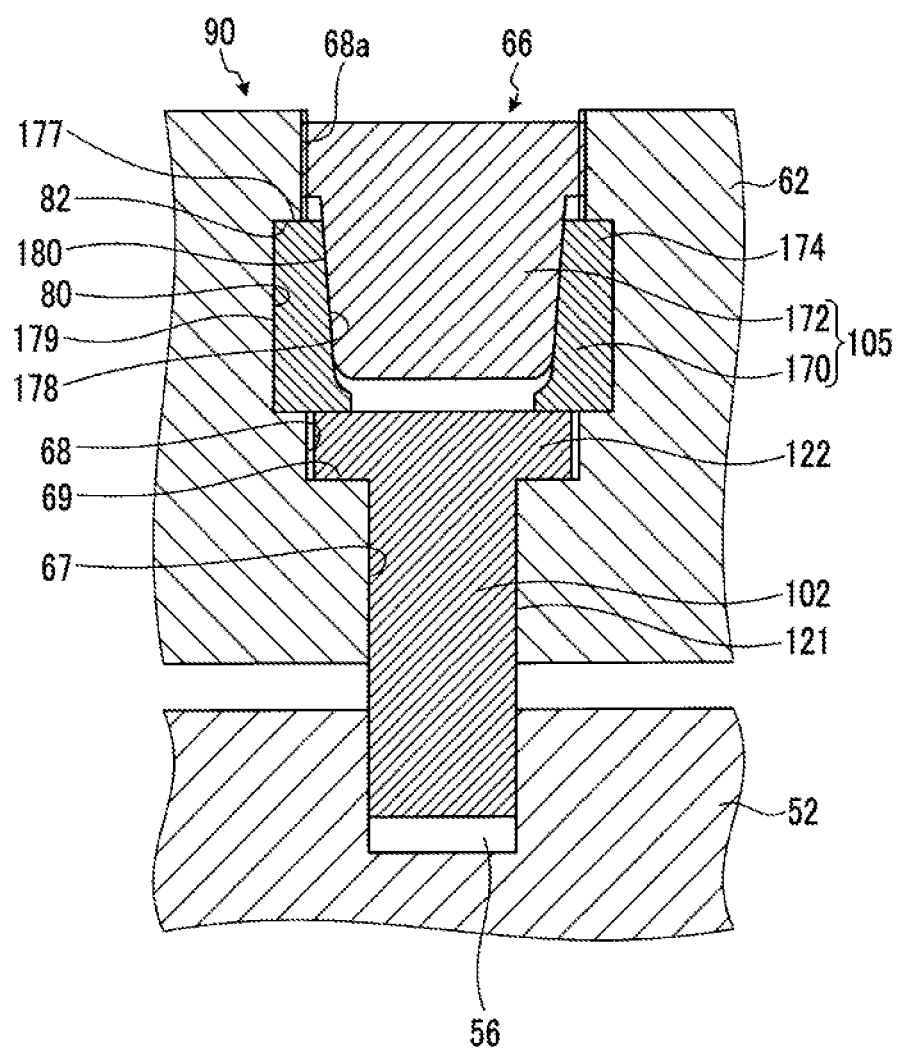
FIG. 3 is a sectional view showing a schematic configuration of the securing device.
Figure 4:
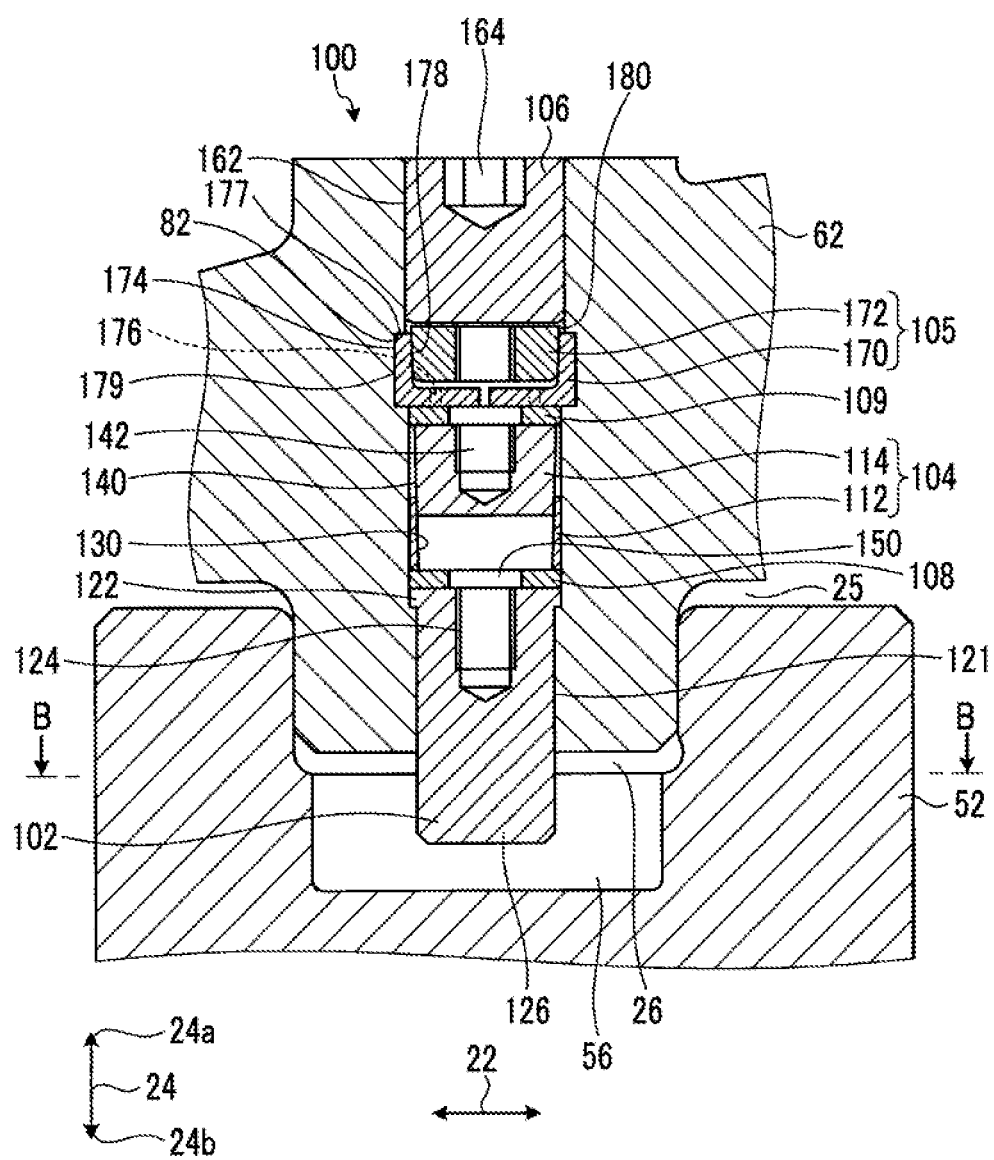
FIG. 4 is a sectional view showing a schematic configuration of a securing device of another example.

Next, the securing device will be described with reference to FIG. 3. FIG. 3 is a sectional view showing the schematic configuration of the securing device. FIG. 4 is a sectional view taken along line A-A of FIG. 2. As shown in FIG. 3, the securing device 90 includes a radial pin 102 and a pin support unit 105 and is inserted into the through-hole 66 and the recess 56. Hereinafter, a radial direction of the rotor 16 which is a rotary portion of the steam turbine 10 is referred to as the radial direction of the rotor. The radial direction of the rotor is a radial direction of the steam turbine and is a radial direction of a rotary machine which indicates a radial direction of a rotary shaft of the rotary machine. In the through-hole 66, a diameter of a first surface 67 which is a portion on an inside 24b in the radial direction 24 of the rotor (an inside in a radial direction 24 of the rotor 16) is smaller than a diameter of a second surface 68 which is a portion on an outside 24a in the radial direction of the rotor (the outside in the radial direction 24 of the rotor 16). In the through-hole 66, a boundary between the first surface 67 and the second surface 68 is a step portion 69. The step portion 69 is a surface visible when viewed from the outside in the radial direction of the rotor, that is, a surface facing the outside in the radial direction of the rotor. The step portion 69 is a portion from which a portion on the outside in the radial direction of the rotor has a larger diameter than a portion on the inside in the radial direction. In this way, the through-hole 66 includes an outside hole which is a portion formed by the second surface 68, and an inside hole which is a portion formed by the first surface 67, is connected to the outside hole on the inside in the radial direction of the rotor, and has a smaller diameter than the outside hole. Moreover, in the through-hole 66, a screw groove 68a is formed in the second surface 68.

Moreover, in the through-hole 66, a support unit insertion groove 80 is formed in the second surface 68 on the first surface 67 side from the position at which the screw groove 68a is formed. The support unit insertion groove 80 is a recess which is formed in the second surface 68 and is formed on the entire periphery in the circumferential direction of the through-hole 66. The support unit insertion groove 80 has an opening diameter which is larger than that of a portion of the second surface 68 adjacent to the support unit insertion groove 80 in the radial direction of the rotor. The support unit insertion groove 80 is formed in a shape in which an opening diameter is constant in the radial direction of the rotor. In the support unit insertion groove 80, the end portion on the outside in the radial direction of the rotor serves as a load receiving surface 82 facing the inside in the radial direction of the rotor. The recess 56 is formed in a groove 57 of the inside member upper half 52.

Next, each portion of the securing device 90 will be described. The radial pin 102 is inserted into the through-hole 66 and the end portion of the radial pin 102 on the inside in the radial direction of the rotor protrudes toward the inside in the radial direction of the rotor from the through-hole 66. The portion of the radial pin 102 protruding from the through-hole 66 is inserted into the recess 56. The radial pin 102 is a columnar pin and is formed such that a diameter of an outer peripheral surface 121 is approximately equal to the diameter of the first surface 67 of the through-hole 66 or is slightly smaller than the diameter of the first surface 67. In addition, in the radial pin 102, a flange 122 having a larger diameter than the outer peripheral surface 121 is formed on the end portion which is on the outside in the radial direction of the rotor in a state where the radial pin 102 is inserted into the through-hole 66. The diameter of the flange 122 is larger than the diameter of the first surface 67 and is smaller than the diameter of the second surface 68. The flange 122 is in contact with the step portion 69.

The pin support unit 105 is disposed on the outside of the radial pin 102 in the radial direction of the rotor. The pin support unit 105 is disposed in the through-hole 66 at a position at which the support unit insertion groove 80 is formed in the radial direction of the rotor. The pin support unit 105 is a mechanism which prevents members including the radial pin 102 disposed on the inside in the radial direction of the rotor from moving toward the outside in the radial direction of the rotor to be extracted from the through-hole 66.

The pin support unit 105 includes a support sleeve 170 and a spacer 172. The support sleeve 170 is a member which is deformable in the radial direction of the through-hole 66. The support sleeve 170 is disposed such that a load receiving surface 177 which is an end surface (a surface facing the outside in the radial direction of the rotary machine) on the outside in the radial direction of the rotor faces the load receiving surface (the surface facing the inside in the radial direction of the rotary machine) 82 of the support unit insertion groove 80. The load receiving surface 177 at least partially overlaps the load receiving surface 82 in a direction orthogonal to the axial direction of the through-hole 66 (the radial direction of the rotor). In an arc-shaped portion 174, an inner peripheral surface 178 faces the spacer 172 and an outer peripheral surface 179 faces the inner peripheral surface of the support unit insertion groove 80. The support sleeve 170 protrudes toward the inside in the radial direction from the support unit insertion groove 80 in the radial direction of the through-hole 66 and at least partially overlaps the flange 122 of the radial pin 102.

The support sleeve 170 is formed in an annular shape which is disposed on the entire periphery of the through-hole 66. The spacer 172 is a columnar member. The spacer 172 is disposed on the outside of the support sleeve 170 in the radial direction of the rotor. The spacer 172 is formed in a columnar shape, and an outer peripheral surface 180 faces the inner peripheral surface 178 of the support sleeve 170. A screw groove screwed to the screw groove 68a of the through-hole 66 is formed in the end portion of the spacer 172 on the outside in the radial direction of the rotor.

In the pin support unit 105, by causing the outer peripheral surface 180 of the spacer 172 to face the inner peripheral surface 178 of the support sleeve 170 and disposing the support sleeve 170 on the outside of the outer peripheral surface 180 in the radial direction of the through-hole 66, the arc-shaped portion 174 is inserted into the support unit insertion groove 80. Accordingly, the load receiving surface 177 of the arc-shaped portion 174 and the load receiving surface 82 of the support unit insertion groove 80 are disposed to overlap each other in the radial direction of the through-hole 66. By screwing the spacer 172 to the screw groove 68a, the pin support unit 105 can secure the spacer 172 to the through-hole 66.

The securing device 90 secures the relative position of the outside member 60 and the inside member 51 in the circumferential direction (rotation direction) of the rotor 16 by the radial pin 102. In addition, the securing device 90 transmits a force generated in a case where the radial pin 102 moves toward the outside in the radial direction of the rotor to the outside member upper half 62 via the support sleeve 170 by the pin support unit 105 which is disposed on the outside of the radial pin 102 in the radial direction of the rotor. That is, the support sleeve 170, which is restrained from moving toward the outside in the radial direction of the rotor by the load receiving surface 177 being in contact with the load receiving surface 82, is in contact with the radial pin 102, and thus, the securing device 90 prevents the radial pin 102 from moving toward the outside in the radial direction and being extracted from the through-hole 66.

Accordingly, the securing device 90 can secure the relative position of the outside member 60 and the inside member 51 in the rotation direction of the rotor 16. In addition, by disposing the pin support unit 105 and causing the load receiving surface 82 of the support unit insertion groove 80 provided in the through-hole 66 and the load receiving surface 177 of the support sleeve 170 to come in contact with each other, the securing device 90 can prevent the radial pin 102 from moving toward the outside in the radial direction of the rotor. Here, in the pin support unit 105, in a case where a force toward the outside in the radial direction of the rotor is applied to the support sleeve 170, the support sleeve 170 is supported by the load receiving surface 82 of the outside member upper half 62. Accordingly, even when a large force toward the outside in the radial direction of the rotor is applied to the radial pin 102, it is possible to support the radial pin 102 by the support sleeve 170. Thus, the securing device 90 having a simple structure can prevent the radial pin 102 from being extracted toward the outside in the radial direction of the rotor. In addition, in the securing device 90, since the position of the support sleeve 170 in the radial direction of the through-hole 66 is restrained by the spacer 172, it is possible to prevent the support sleeve 170 from buckling and the support sleeve 170 can withstand a large load.

In addition, in the securing member 90 installed in the steam turbine 10, the radial pin 102 is subjected to high-pressure steam inside the outside member 60. Accordingly, a force which is applied to the radial pin 102 and tries to move the radial pin 102 toward the outside in the radial direction of the rotor becomes considerably large. Meanwhile, in the securing device 90, since the support sleeve 170 has the structure which is supported by the load receiving surface 82 formed in the outside member 60, it is possible to decrease the number of components of the configuration for restraining the movement of the radial pin 102 and make the device compact while receiving the force applied to the radial pin 102.

Next, a securing device of another example will be described in detail with reference to FIGS. 4 to 9.

Figure 5:
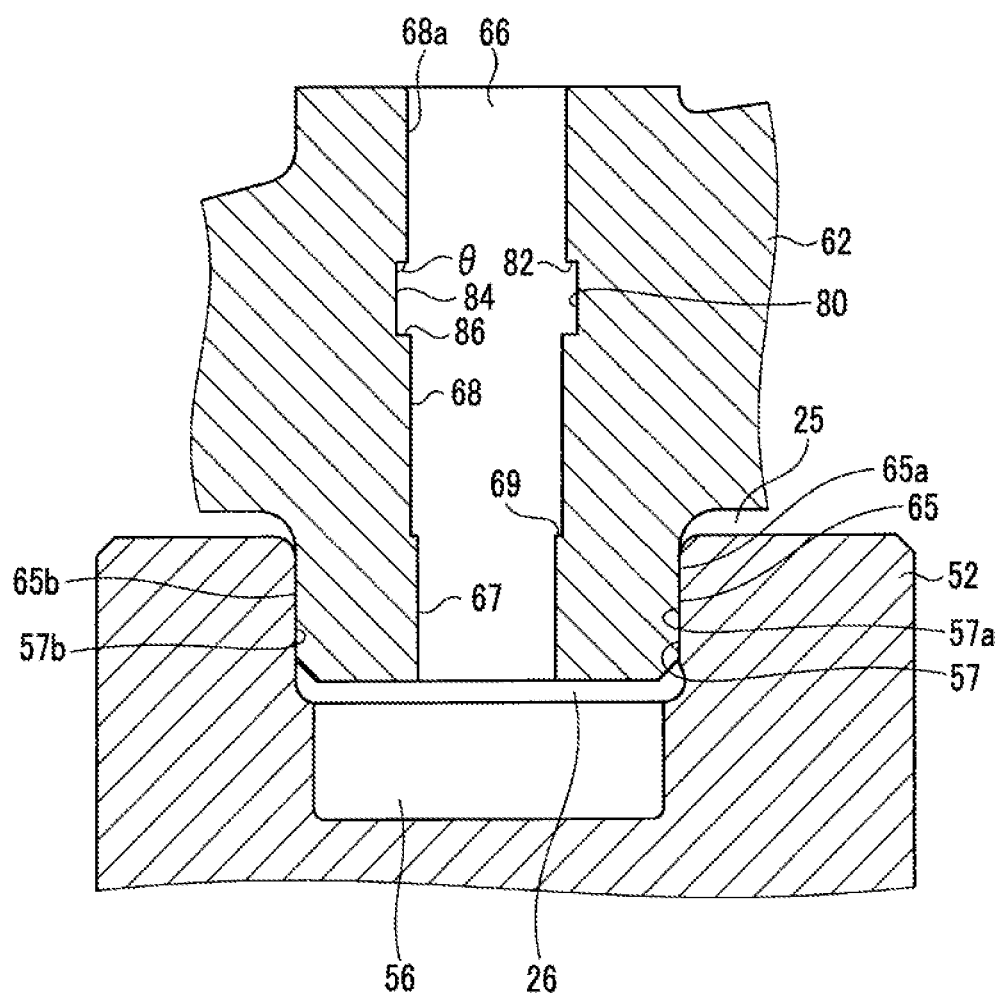
FIG. 5 is a sectional view showing a schematic configuration in a state where the securing device is removed from an outside member and an inside member.
Figure 6:
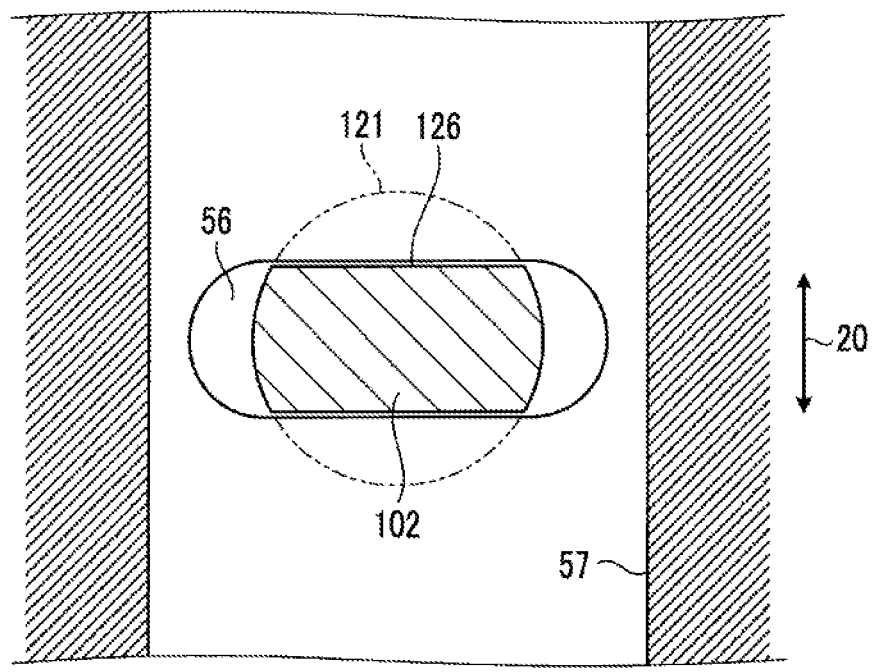
FIG. 6 is a schematic view showing a relative position of the inside member and a radial pin.
Figure 7:
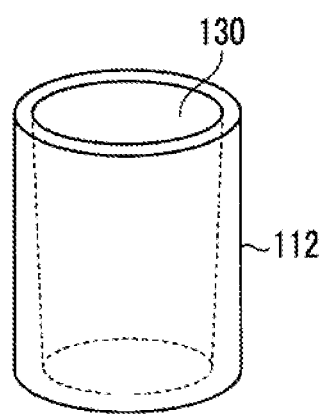
FIG. 7 is a perspective view showing a schematic configuration of a seal sleeve of a seal unit.
Figure 8:
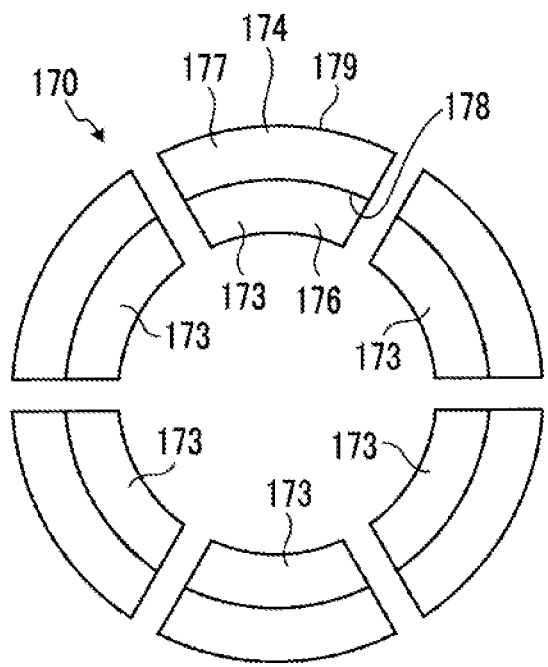
FIG. 8 is a top view showing a schematic configuration of a plurality of split sleeves of a support sleeve of a pin support unit.
Figure 9:
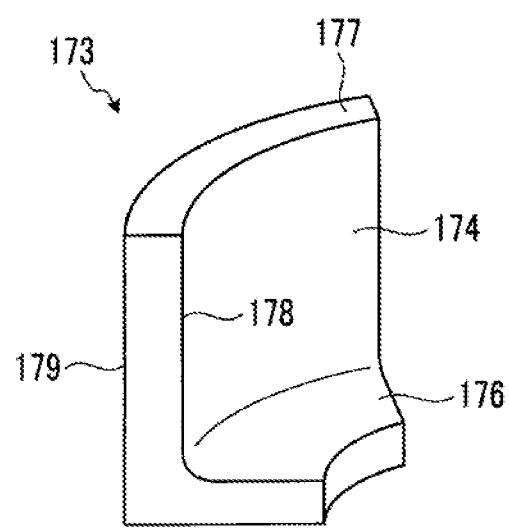
FIG. 9 is a top view showing a schematic configuration of the split sleeve of the support sleeve.

FIG. 4 is a sectional view showing the schematic configuration of the securing device. FIG. 4 is a view from a position corresponding to the cross section of line A-A in FIG. 2. FIG. 5 is a sectional view showing a schematic configuration in a state where the securing device is removed from an outside member and an inside member. FIG. 6 is a sectional view taken along line B-B of FIG. 4 and is a schematic view showing a relative position of the inside member and a radial pin. FIG. 7 is a perspective view showing a schematic configuration of a seal sleeve of a seal unit. FIG. 8 is a top view showing a schematic configuration of a support sleeve of a pin support unit. FIG. 9 is a top view showing a schematic configuration of a split sleeve of the support sleeve.

As shown in FIG. 4, a securing device 100 includes the radial pin 102, a seal unit 104, the pin support unit 105, a cover member 106, and liners 108 and 109, and is inserted into the through-hole 66 and the recess 56. Here, as shown in FIGS. 4 and 5, in the through-hole 66, the diameter of the first surface 67 which is the portion on the inside 24b in the radial direction of the rotor (the inside in the radial direction 24 of the rotor 16) is smaller than the diameter of the second surface 68 which is the portion on the outside 24a in the radial direction of the rotor (the outside in the radial direction 24 of the rotor 16). In the through-hole 66, the boundary between the first surface 67 and the second surface 68 is the step portion 69. The step portion 69 is a surface visible when viewed from the outside in the radial direction of the rotor, that is, a surface facing the outside in the radial direction of the rotor. The step portion 69 is a portion from which the portion on the outside in the radial direction of the rotor has a larger diameter than the portion on the inside in the radial direction. In this way, the through-hole 66 includes the outside hole which is the portion formed by the second surface 68, and the inside hole which is the portion formed by the first surface 67, is connected to the outside hole on the inside in the radial direction of the rotor, and has a smaller diameter than the outside hole. Moreover, in the through-hole 66, the screw groove 68a is formed in the second surface 68.

Moreover, in the through-hole 66, the support unit insertion groove 80 is formed in the second surface 68 on the first surface 67 side from the position at which the screw groove 68a is formed. The support unit insertion groove 80 is a recess which is formed in the second surface 68 and is formed on the entire periphery in the circumferential direction of the through-hole 66. The support unit insertion groove 80 has an opening diameter which is larger than that of a portion of the second surface 68 adjacent to the support unit insertion groove 80 in the radial direction of the rotor. An inner peripheral surface 84 of the support unit insertion groove 80 is formed in a shape in which an opening diameter is constant in the radial direction of the rotor. That is, the inner peripheral surface 84 is a surface in which the line in the radial direction of the rotor is perpendicular to the radial direction of the through-hole 66. In the support unit insertion groove 80, the end portion on the outside in the radial direction of the rotor serves as the load receiving surface 82 facing the inside in the radial direction of the rotor. In the support unit insertion groove 80, the end portion on the inside in the radial direction of the rotor is a step portion 86 facing the outside in the radial direction of the rotor. The load receiving surface 82 of the present embodiment is a surface orthogonal to the radial direction of the rotor. An angle θ between the load receiving surface 82 and a surface (peripheral surface) on the inside of the load receiving surface 82 in the radial direction of the rotor is 90°.

The recess 56 is formed in the groove 57 of the inside member upper half 52. The groove 57 is a groove which is formed on the entire periphery in the rotation direction. That is, the groove 57 is formed in both of the inside member upper half 52 and the inside member lower half 54, and becomes a groove which is formed on the entire periphery as these grooves are connected. A protrusion 65 which is provided in the outside member upper half 62 of the outside member 60 at a portion where the through-hole 66 is formed is inserted into the groove 57. The protrusion 65 is a protrusion protruding toward the inside in the radial direction of the rotor, is formed at a position facing the groove 57, and similarly to the groove 57, is formed on the entire periphery in the rotation direction. In the groove 57 and the protrusion 65, a surface 57a and a surface 65a which are contact surfaces on a high-pressure steam space 25 side in an axial direction 22, that is, the side of the space through which steam having a higher pressure flows are in contact with each other so as to form a seal surface. In the securing device 100, a space on the steam inlet 40 side of the seal surface on which the surface 57a and the surface 65a are in contact with each other is the high-pressure steam space 25, and a space on the end side in the axial direction 22 of the seal surface on which the surface 57a and the surface 65a are in contact with each other is a low-pressure steam space 26 in which the pressure is lower than that of the high-pressure steam space 25. In addition, since the groove 57 and the protrusion 65 may have any configuration as long as the surface 57a and the surface 65a are in contact with each other, surfaces 57b and 65b opposite to the seal surface in the axial direction 22 may be partially or entirely omitted in the circumferential direction.

Next each portion of the securing device 100 will be described. Similarly to the radial pin 102 of the securing device 90, the radial pin 102 is inserted into the through-hole 66 and the end portion of the radial pin 102 on the inside in the radial direction of the rotor protrudes toward the inside in the radial direction of the rotor from the through-hole 66. The portion of the radial pin 102 protruding from the through-hole 66 is inserted into the recess 56. The radial pin 102 is a columnar pin and is formed such that a diameter of an outer peripheral surface 121 is approximately equal to the diameter of the first surface 67 of the through-hole 66 or is slightly smaller than the diameter of the first surface 67. In addition, in the radial pin 102, the flange 122 having a larger diameter than the outer peripheral surface 121 is formed on the end portion which is on the outside in the radial direction of the rotor in a state where the radial pin 102 is inserted into the through-hole 66. The diameter of the flange 122 is larger than the diameter of the first surface 67 and is smaller than the diameter of the second surface 68. The flange 122 is in contact with the step portion 69. In the radial pin 102, a screw hole 124 is formed in the surface on which the flange 122 is formed. When the radial pin 102 is inserted or extracted, a tool is inserted into the screw hole 124. In addition, in the radial pin 102, a notch surface 126 is provided on a portion of an end portion of the outer peripheral surface 121 on the inside in the radial direction of the rotor. As shown in FIG. 6, the radial pin 102 has a shape in which the diameter of the outer peripheral surface 121 is wider than the width of the recess 56 in the rotation direction. Since the notch surface 126 is provided in the radial pin 102, the end portion on the inside in the radial direction of the rotor can be inserted into the recess 56. In addition, since the notch surface 126 is formed on the radial pin 102, the width in the circumferential direction 20 can be approximately the same as the width of the recess 56. In addition, the notch surfaces 126 are provided on both ends in the circumferential direction 20 in the present embodiment. However, the notch surface 126 may be provided on only one end. In addition, the notch surfaces 126 provided on both ends in the rotation direction may be asymmetrical with respect to the axis of the outer peripheral surface 121. Moreover, in the present embodiment, the notch surface 126 is provided on the radial pin 102. However, as another example, structure in which the radial pin 102 is fitted into the recess 56 by adjusting the width of the radial pin 102 with respect to the width of the recess 56 may be adopted.

Next, the seal unit 104 is inserted into the through-hole 66 and is disposed on the outside of the radial pin 102 in the radial direction of the rotor. The seal unit 104 supports the radial pin 102 from the outside in the radial direction of the rotor and prevents the radial pin 102 from moving toward the outside in the radial direction of the rotor. In addition, the seal unit 104 seals the through-hole 66, that is, hermetically seals the through-hole 66. Specifically, the seal unit 104 is in contact with the inner peripheral surface of the through-hole 66 in the radial direction of the rotor to seal the through-hole 66.

The seal unit 104 includes a seal sleeve 112 and a seal insertion member 114. As shown in FIG. 7, the seal sleeve 112 has a tubular shape along the through-hole 66, and in the present embodiment, the seal sleeve 112 is a cylindrical member. The seal sleeve 112 has a shape in which the diameter of the outer peripheral surface is smaller than that of the second surface 68 of the through-hole 66. The seal sleeve 112 has a taper shape in which the diameter of an inner peripheral surface 130 gradually decreases toward the inside in the radial direction of the rotor.

The seal insertion member 114 is a columnar member. The seal insertion member 114 is disposed on the outside of the seal sleeve 112 in the radial direction of the rotor. The seal insertion member 114 has a taper shape in which the diameter of an outer peripheral surface 140 gradually decreases toward the inside in the radial direction of the rotor. An inclination angle of the outer peripheral surface 140 with respect to the radial direction of the rotor is substantially the same as an inclination angle of the inner peripheral surface 130 of the seal sleeve 112 with respect to the radial direction of the rotor. "Substantially the same" means that there is no difference between the angles other than errors occurring during manufacturing. In addition, the inclination angle of the outer peripheral surface 140 with respect to the radial direction may be different from the inclination angle of the inner peripheral surface 130 of the seal sleeve 112 with respect to the radial direction. In the seal insertion member 114, a screw hole 142 is formed in a surface which is on the outside in the radial direction of the rotor.

The seal unit 104 has the above-described structure, and the seal insertion member 114 is inserted into the seal sleeve 112 from the outside in the radial direction of the rotor, the seal sleeve 112 is expanded toward the outside in the radial direction of the rotor while the inner peripheral surface 130 and the outer peripheral surface 140 are brought into contact with each other, and thus, the seal sleeve 112 and the through-hole 66 are brought into contact with each other. The seal unit 104 seals the through-hole 66 by filling a gap between the seal sleeve 112 and the seal insertion member 114 and a gap between the seal sleeve 112 and the through-hole 66.

The pin support unit 105 is disposed on the outside of the seal unit 104 in the radial direction of the rotor. The pin support unit 105 is disposed in the through-hole 66 at a position at which the support unit insertion groove 80 is formed in the radial direction of the rotor. The pin support unit 105 is a mechanism which prevents members including the radial pin 102 disposed on the inside in the radial direction of the rotor from moving toward the outside in the radial direction of the rotor to be extracted from the through-hole 66.

The pin support unit 105 includes the support sleeve 170 and the spacer 172. The support sleeve 170 includes a plurality of split sleeves 173, and in the present embodiment, includes six split sleeves 173. Each of the split sleeves 173 includes an arc-shaped portion 174 and an extension portion 176. The arc-shaped portion 174 has a plate shape which extends in the radial direction of the rotor and forms an arc along the support unit insertion groove 80 of the through-hole 66. The arc-shaped portion 174 is disposed such that the load receiving surface 177 which is an end surface on the outside in the radial direction of the rotor faces the load receiving surface 82 of the support unit insertion groove 80. The load receiving surface 177 at least partially overlaps the load receiving surface 82 in the direction orthogonal to the axial direction of the through-hole 66 (the radial direction of the rotor). In the arc-shaped portion 174, the inner peripheral surface 178 faces the spacer 172 and the outer peripheral surface 179 faces the inner peripheral surface of the support unit insertion groove 80. The extension portion 176 is a fan-shaped member connected to the end portion of the arc-shaped portion 174 on the downside in the radial direction of the rotor and protrudes toward the center side of the through-hole 66 from the arc-shaped portion 174. That is, in the extension portion 176, the arc-shaped portion of the fan shape on the side having a larger diameter is in contact with the arc-shaped portion 174. In the extension portion 176, the surface on the inside in the radial direction of the rotor faces the seal unit 104. The extension portion 176 protrudes toward the inside in the radial direction from the support unit insertion groove 80 in the radial direction of the through-hole 66 and at least partially overlaps the liner 109. The extension portion 176 at least partially may overlap the radial pin 170.

In the support sleeve 170, the arc-shaped portions 174 and the extension portions 176 form an annular ring disposed on the entire periphery of the through-hole 66 by combining the arc-shaped split sleeves 173 in the circumferential direction of the through-hole 66. In a case where the split sleeves 173 of the support sleeve 170 are disposed in the support unit insertion groove 80, a gap is provided between the split sleeve 173 and the adjacent split sleeve 173 in the circumferential direction of the through-hole 66. In the support sleeve 170, since the gap is provided between the split sleeve 173 and the adjacent split sleeve 173, it is possible to insert the split sleeves 173 into the support unit insertion groove 80.

In the support sleeve 170, preferably, the diameter of the arc of the outer peripheral surface 179 of the arc-shaped portion 174 is the same as the diameter of the inner peripheral surface of the support unit insertion groove 80. In the support sleeve 170, preferably, the diameter of the arc of the inner peripheral surface 178 of the arc-shaped portion 174 is the same as the diameter of the outer peripheral surface 180 of the spacer 172. In this way, in the pin support unit 105, since the diameters of the surfaces being in contact with each other are the same as each other, the members can be more reliably brought into contact with each other.

The spacer 172 is a columnar member. The spacer 172 is disposed on the outside of the support sleeve 170 in the radial direction of the rotor. The spacer 172 is formed in a columnar shape, and the outer peripheral surface 180 faces the arc-shaped portion 174. In the spacer 172, the through-hole 66 is formed on the inner peripheral surface 178.

In the pin support unit 105, the outer peripheral surface 180 of the spacer 172 faces the inner peripheral surfaces 178 of the arc-shaped portions 174 of the support sleeve 170, the arc-shaped portions 174 of the support sleeve 170 are disposed on the outside of the outer peripheral surface 180 in the radial direction of the through-hole 66, and thus, the arc-shaped portions 174 are inserted into the support unit insertion groove 80. Accordingly, the load receiving surfaces 177 of the arc-shaped portions 174 and the load receiving surface 82 of the support unit insertion groove 80 are disposed to overlap each other in the radial direction of the through-hole 66.

The cover member 106 is a columnar member and is inserted into the through-hole 66. The cover member 106 is disposed on the outside of the pin support unit 105 in the radial direction of the rotor. In the cover member 106 of the present embodiment, the end surface on the outside in the radial direction of the rotor is disposed on the inside in the radial direction of the rotor from the end surface of the outside member upper half 62 on the outside in the radial direction of the rotor, and the cover member 106 is embedded in the through-hole 66. The cover member 106 is secured to the outside member upper half 62 in which the through-hole 66 is formed. A screw groove is formed in an outer peripheral surface 162 of the cover member 106, and the cover member 106 is screwed to the screw groove 68a of the second surface 68 of the through-hole 66. A hexagonal groove 164 is formed in the end surface of the cover member 106 on the outside in the radial direction of the rotor. When the cover member 106 is inserted or extracted, a tool is inserted into the hexagonal groove 164.

The liner 108 is disposed between the seal sleeve 112 and the radial pin 102. The liner 108 is a ring-shaped member in which a cylindrical hole 150 is formed. The liner 108 is a member which adjusts the thickness of the seal unit 104 in the radial direction of the rotor. In addition, the liner 108 is formed such that the diameter on the inside in the radial direction of the rotor, that is, the diameter of the cylindrical hole 150 is smaller than the diameter of the inner peripheral surface 130 of the seal sleeve 112. That is, the width of the liner 108 in the radial direction is wider than that of the seal sleeve 112. Accordingly, the liner 108 can be in contact with the flange 122 of the radial pin 102 while supporting the seal sleeve 112. Therefore, the liner 108 prevents the seal sleeve 112 from being interposed between the radial pin 102 and the through-hole 66 or the seal sleeve 112 from being deformed in an unintended manner. The outer diameter of the liner 108 is larger than the outer diameter of the radial pin 102, and the above-described effects can be obtained as long as the liner 108 is formed to extend to the inside from the outer diameter of the radial pin 102 in the radial direction of the radial pin 102.

The liner 109 is disposed between the seal insertion member 114 and the support sleeve 170. The liner 109 is a ring-shaped member in which a cylindrical hole 150 is formed. The liner 109 is a member which adjusts the thickness of the seal unit 104 in the radial direction of the rotor. In the securing device 100, since the liner 109 of which the thickness has been adjusted is disposed between the seal insertion member 114 and the support sleeve 170, the gap between the seal insertion member 114 and the support sleeve 170 can be filled with the liner 109. In addition, the liner 109 partially overlaps the seal insertion member 114 and partially overlaps the support sleeve 170 in the radial direction of the through-hole 66 (the direction orthogonal to the radial direction of the rotor). That is, when the through-hole 66 is viewed from the outside in the radial direction of the rotor, the liner 109 partially overlaps the seal insertion member 114 and partially overlaps the support sleeve 170. Accordingly, the liner 109 can be in contact with the flange of the seal insertion member 114 while supporting the support sleeve 170. Therefore, the liner 109 can transmit a force acting toward the outside in the radial direction of the rotor, from the seal insertion member 114 toward the support sleeve 170, to the support sleeve 170 from the seal insertion member 114.

The securing device 100 secures the relative position of the outside member 60 and the inside member 51 in the rotation direction of the rotor 16 by the radial pin 102. In addition, the securing device 100 seals the through-hole 66 by the seal unit 104 which is disposed on the outside in the radial direction of the rotor from the radial pin 102. Moreover, the securing device 100 transmits a force generated in a case where the radial pin 102 and the seal unit 104 move toward the outside in the radial direction of the rotor to the outside member upper half 62 via the support sleeve 170 by the pin support unit 105 disposed on the outside of the radial pin 102 and the seal unit 104 in the radial direction of the rotor. That is, the support sleeve 170, which is restrained from moving toward the outside in the radial direction of the rotor by the load receiving surface 177 being in contact with the load receiving surface 82, is in contact with the seal unit 104 via the liner 109, and thus, the securing device 100 prevents the radial pin 102 and the seal unit 104 from moving toward the outside in the radial direction and being extracted from the through-hole 66. In addition, in the securing device 100, the cover member 106 prevents the spacer 172 of the pin support unit 105 from moving toward the outside in the radial direction of the rotor and being extracted from the through-hole 66.

Accordingly, the securing device 100 can secure the relative position of the outside member 60 and the inside member 51 in the rotation direction of the rotor 16 while sealing the through-hole 66. In the securing device 100, by disposing the pin support unit 105 and bringing the load receiving surface 82 of the support unit insertion groove 80 provided in the through-hole 66 and the load receiving surface 177 of the support sleeve 170 into contact with each other, it is possible to prevent the radial pin 102 and the seal unit 104 from moving toward the outside in the radial direction of the rotor. Here, in the pin support unit 105, in the case where a force toward the outside in the radial direction of the rotor is applied to the support sleeve 170, the support sleeve 170 is supported by the load receiving surface 82 of the outside member upper half 62. Accordingly, even when a large force toward the outside in the radial direction of the rotor is applied to the radial pin 102 and the seal unit 104, it is possible to support the radial pin 102 and the seal unit 104 by the support sleeve 170. Thus, in the securing device 100, a load applied to the cover member 106 can be reduced, and the structure of the cover member 106 can be simplified. In addition, in the securing device 100, since the position of the support sleeve 170 in the radial direction of the through-hole 66 is restrained by the spacer 172, it is possible to prevent the support sleeve 170 from buckling and the support sleeve 170 can withstand a large load.

Moreover, in the securing device 100, each member is hermetically sealed by the seal unit 104 while being inserted and the cover member 106 is screwed by the screw structure to be secured to the outside member 60. Accordingly, the securing device 100 can be secured without performing welding. In addition, it is possible to simply perform attachment or detachment of the securing device 100 to or from the annular member 50. Moreover, since the securing device 100 has the seal structure in which the seal sleeve 112 of the seal unit 104 disposed inside the through-hole 66 is deformed by the seal insertion member 114 and is brought into contact with the inner peripheral surface of the through-hole 66 in the radial direction of the rotor, it is possible to seal the through-hole 66 even at a narrow location at which the diameter of the through-hole 66 cannot be increased. In addition, since the outside member 60 and the inside member 51 are secured to each other by the radial pin 102 and sealing is performed by the seal unit 104, even in a case where the centers of the recess 56 and the through-hole 66 do not coincide with each other, it is possible to secure the outside member 60 and the inside member 51 while maintaining sealability. Moreover, since the seal unit 104 is configured such that the seal insertion member 114 is pushed into the seal sleeve 112 to perform sealing, even in a case where the centers of respective members deviate from each other when being inserted, the relative position thereof moves in a direction in which the centers coincide with each other, and thus, it is possible to further increase sealability.

The securing device 100 includes the seal unit 104 and the radial pin 102, so that, even in a case where the axial center of the through-hole at the position at which the seal unit 104 is inserted, that is, the axial center of the columnar through-hole formed by the second surface 68 and the axial center of the through-hole at the position at which the radial pin 102 is inserted, that is, the axial center of the columnar through-hole formed by the first surface 67 deviate from each other, since the seal unit 104 can move in the radial direction with respect to the radial pin 102, it is possible to uniformly expand the seal sleeve 112. Therefore, the accuracy of the axial center of the through-hole is allowed to be low, so that the manufacturing of the through-hole is easily performed.

Moreover, in the securing device 100, since the liner 109 is disposed, it is possible to decrease the gap between the seal unit 104 and the pin support unit 105, and it is possible to appropriately transmit a force from the seal unit 104 to the pin support unit 105. Moreover, by providing the liner 109, the position of the end portion of the pin support unit 105 on the inside in the radial direction of the rotor can be set to a constant position. Accordingly, it is possible to more reliably insert the pin support unit 105 into the support unit insertion groove 80.

In addition, by disposing the liner 108 in the securing device 100, the seal sleeve 112 can be stably supported by the liner 108, and even when the position of the axial center of the through-hole on the inside in the radial direction of the rotor and the position of the axial center of the through-hole on the outside in the radial direction of the rotor at which the seal sleeve 112 is disposed deviate from each other, it is possible to uniformly expand the seal sleeve 112. Moreover, since the seal sleeve 112 is supported by the liner 108, it is possible to prevent the seal sleeve 112 from deforming by entering the gap between the flange 122 of the radial pin 102 and the through-hole. Accordingly, the accuracy of the axial center of the through-hole is allowed to be low, so that the manufacturing of the through-hole is easily performed.

In the securing device 100, since the liner 108 is provided between the radial pin 102 and the seal unit 104 and the seal sleeve 112 is supported by the liner 108, it is possible to prevent the seal sleeve 112 from being interposed between the radial pin 102 and the through-hole 66. Accordingly, since the seal sleeve 112 can be thinned, the seal sleeve 112 can be formed to be easily deformed. In this way, since the seal sleeve 112 is thinned to be easily deformed, it is possible to increase sealability between the seal sleeve 112 and the through-hole 66 and between the seal sleeve 112 and the seal insertion member 114, and it is possible to increase sealability of the seal unit 104. In addition, by providing the liner 108 in the securing device 100, it is possible to easily adjust the position in the radial direction of the rotor, that is, the position in the depth direction of the through-hole 66. That is, since it is possible to adjust the thickness of the liner 108 by a shim or the like, it is possible to set the position of the seal sleeve 112 in the depth direction of the through-hole 66 to a constant position irrespective of the shape of the radial pin 102.

Moreover, since the securing device 100 can be embedded in the through-hole 66, the securing device 100 can be provided even in a case where other members are provided on the outer peripheral surface of the outside member 60 and there is a limitation in a usable space.

In addition, in the securing device 100, since the extension portions 176 protruding toward the center of the through-hole 66 from the arc-shaped portions 174 are provided on the inside of the split sleeves 173 in the radial direction of the rotor, the split sleeves 173 can be more reliably brought into contact with a member disposed on the inside in the radial direction of the rotor. Accordingly, preferably, the extension portions 176 are provided in the split sleeves 173. However, the extension portions 176 may not be provided.

In addition, in the above-described embodiment, the hole formed in the surface of each of the radial pin 102, the seal insertion member 114, and the cover member 106 on the outside in the radial direction of the rotor is the screw hole. However, the present invention is not limited to the case where the screw groove is formed. Any configuration may be adopted as long as a hole in which a tool can be locked or a hole capable of rotating the tool and catching the tool is provided. In addition, if the hole is not provided, attachment and detachment are difficult. However, in order to save time and labor for processing, the hole which comes into contact with a tool may not be provided in the surface of each of the radial pin 102, the seal insertion member 114, and the cover member 106 formed on the outside in the radial direction of the rotor.

Here, in the present embodiment, the hexagonal groove 164 is formed in the cover member 106 of the securing device 100. However, the present invention is not limited to this. The attachment position of a tool in a case where the cover member 106 is screwed to the screw groove 68a of the through-hole 66 may be provided in a form different from the screw hole. For example, in the cover member 106, a hexagonal protruding portion may be provided on the outside of the portion, in which the outer peripheral surface is provided, in the radial direction of the rotor. By providing the protruding portion, it is possible to rotate the cover member 106 by a tool such as a hexagonal wrench.

In addition, in the securing device 100, the liner 108 may not be provided. That is, in the securing device 100, the liner 108 may not be provided, and the seal sleeve 112 of the seal unit 104 may be in direct contact with the radial pin 102. Moreover, in the securing device 100, the liner 109 may not be provided. That is, in the securing device 100, the liner 109 may not be provided, and the support sleeve 170 of the pin support unit 105 may be in direct contact with the seal insertion member 114 of the seal unit 104.

In addition, in the securing device 100 of the above-described embodiment, since the seal unit 104 is provided between the radial pin 102 and the pin support unit 105, it is possible to prevent the positional deviation between the seal unit 104 and the radial pin 102 in the radial direction of the rotor by the pin support unit 105, and it is possible to support the radial pin 102 while maintaining the sealability of the seal unit 104. Accordingly, preferably, in the securing device 100, the seal unit 104 is provided between the radial pin 102 and the pin support unit 105. However, the position at which a seal mechanism is provided is not limited to this. In the securing device 100, as the seal mechanism, a seal ring may be provided in a contact portion between the cover member 106 and the outside member upper half 62. In addition, in the securing device 100, the contact surface between the radial pin 102 and the through-hole 66 may be sealed by a seal mechanism. Moreover, the seal mechanism may not be provided in the securing device 100, and a seal mechanism separated from the securing device 100 may be provided.

Figure 10:
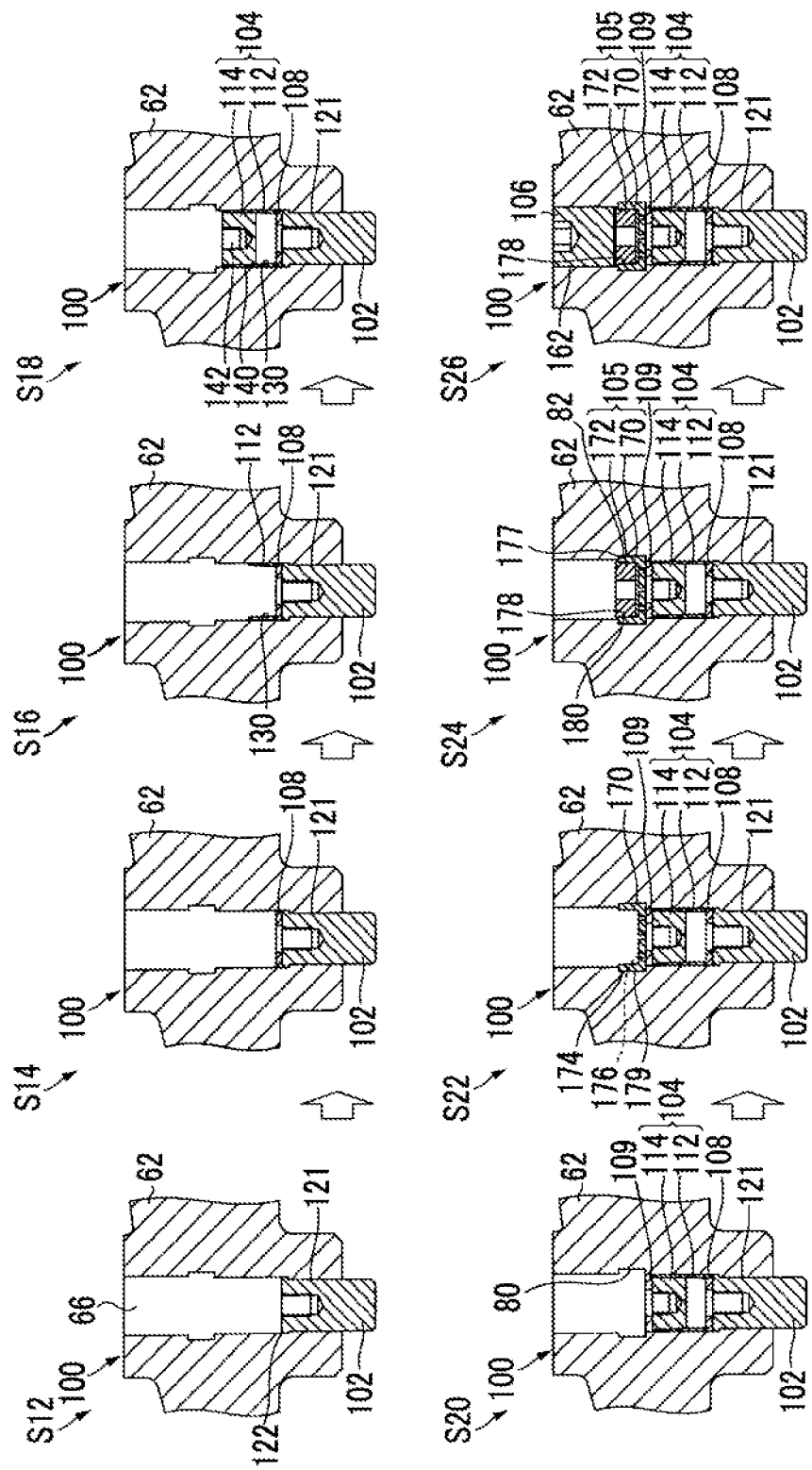
FIG. 10 is an explanatory view showing an example of a method for mounting the securing device.
Figure 11:
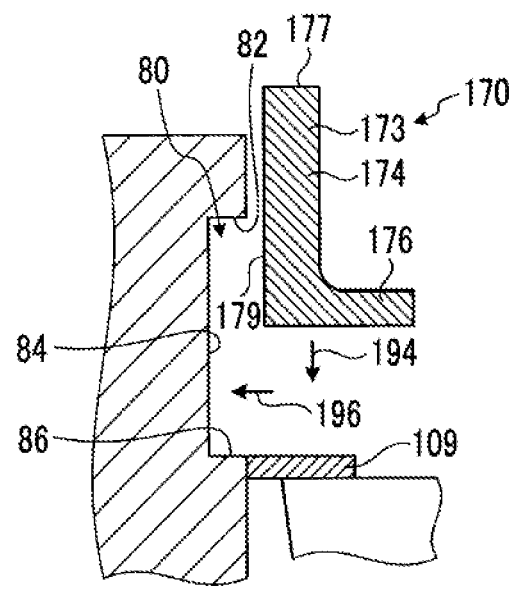
FIG. 11 is an explanatory view showing the example of the method for mounting the securing device.
Figure 12:
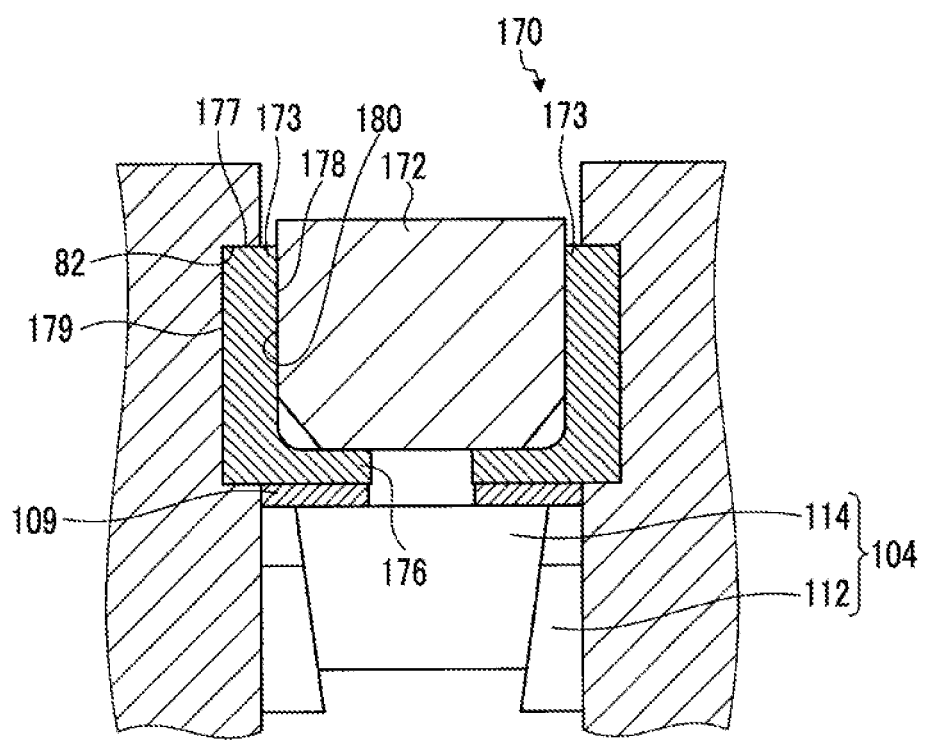
FIG. 12 is an explanatory view showing the example of the method for mounting the securing device.

Next, a securing device mounting method which is a rotary machine assembly method will be described with reference to FIGS. 10 to 12. FIG. 10 is an explanatory view showing an example of a method for mounting the securing device. Each of FIGS. 11 and 12 is an explanatory view showing the example of the method for mounting the securing device. The rotary machine assembly method can be used in a case where the rotary machine is assembled after the rotary machine is disassembled for maintenance or the like or when the rotary machine is manufactured. In addition, in the present embodiment, the securing device mounting method is described as the rotary machine assembly method, but the securing device mounting method can be also applied to a rotary machine manufacturing method. Processing shown in FIG. 10 can be performed by a worker performing a work using a tool or a machine. First, a worker inserts the radial pin 102 into the through-hole 66 of the outside member upper half 62 (Step S12). Here, the worker confirms the relative position of the through-hole 66 and the recess 56 and forms the notch surface 126 on the radial pin 102 based on the confirmed result. Accordingly, it is possible to insert the tip of the radial pin 102 into the recess 56 when the radial pin 102 is inserted into the through-hole 66, and the tip of the radial pin 102 is fitted to the recess 56 in the rotation direction of the rotor 16.

Next, the worker inserts the liner 108 into the through-hole 66 into which the radial pin 102 is inserted (Step S14), inserts the seal sleeve 112 (Step S16), and thereafter, inserts the seal insertion member 114 (Step S18). In this case, the worker pushes the seal insertion member 114 toward the inside in the radial direction of the rotor using a jig while managing an insertion amount and a pushing force (rotating torque in a case where a jig inserted into the screw groove is used). Accordingly, it is possible to appropriately push the seal insertion member 114 into the seal sleeve 112 of the seal unit 104 and the through-hole 66 can be sealed by the seal unit 104. Thus, the radial pin 102, the liner 108, and the seal unit 104 have been inserted into the insertion hole 66.

Next, the worker inserts the liner 109 into the through-hole 66 into which the seal unit 104 is inserted (Step S20). In this case, the worker inserts the liner 109 having such a thickness that the end surface of the liner 109 on the outside in the radial direction of the rotor coincides with the end surface of the support unit insertion groove 80 on the inside in the radial direction of the rotor.

Next, the worker disposes the support sleeve 170 in the support unit insertion groove 80 of the through-hole 66 into which the liner 109 is inserted (Step S22). Specifically, as shown in FIG. 11, the split sleeve 173 is moved toward the inside in the radial direction of the rotor as shown by an arrow 194 and moved to the position at which the split sleeve 173 comes into contact with the liner 109. Thereafter, the split sleeve 173 is moved toward the outside in the radial direction of the through-hole 66 as shown by an arrow 196 to be inserted into the support unit insertion groove 80, so that the outer peripheral surface 179 faces the inner peripheral surface 84 and the load receiving surface 177 faces the load receiving surface 82. The worker repeats the work to insert all the split sleeves 173 into the support unit insertion groove 80 and causes the load receiving surfaces 177 to face the load receiving surface 82. Accordingly, the split sleeves 173 are disposed on the entire periphery of the support unit insertion groove 80.

Next, the worker inserts the spacer 172 into the through-hole 66 in which the support sleeve 170 is disposed (Step S24). Specifically, as shown in FIG. 12, the spacer 172 is inserted into the inner peripheral surfaces 178 side of the arc-shaped portions 174 of the split sleeves 173, so that the inner peripheral surfaces 178 face the outer peripheral surface 180.

Next, the worker inserts the cover member 106 into the through-hole 66. Specifically, the screw groove of the cover member 106 is screwed to the screw groove of the through-hole 66. In this case, the worker can appropriately push the spacer 172 of the pin support unit 105 by setting a pushing position and fastening torque of the cover member 106 to predetermined values. The worker inserts the cover member 106 into the through-hole 66 to secure the cover member 106 to the outside member upper half 62 (Step S26).

Since the worker installs the securing device 100 as described above, the worker can simply mount the securing device 100 on the annular member 50. Accordingly, it is possible to simply assemble the annular member 50 in a state where the annular member 50 is not rotated in the rotation direction without using welding.

Moreover, as shown in FIGS. 11 and 12, since the end portion of the inner peripheral surface 84 of the support unit insertion groove 80 in the radial direction of the rotor is formed to be recessed so as to form a surface perpendicular to the radial direction of the rotor with respect to the second surface (outside hole inner peripheral surface) 68 of the through-hole 66, it is possible to increase formability. In addition, since it is possible to easily adjust the position of the support sleeve 170 using the liner 109, the support sleeve 170 can be easily brought into close contact with the support unit insertion groove 80 or can be easily installed in the support unit insertion groove 80, and it is possible to easily transfer a compression force from the spacer 172 to the support sleeve 170.

In addition, in the assembly method for the securing device, in a case where a currently-mounted securing device is not the securing device of the present embodiment, it is possible to mount the securing device 100 by processing the through-hole. For example, in a case where a through-hole of which the diameter does not change is formed by the first surface 67, the second surface 68 is formed by performing processing which partially widens the diameter on the outside in the radial direction of the rotor, and then the screw groove 68a is formed, to form the through-hole 66. In addition, thereafter, the support unit insertion groove 80 is formed in the formed second surface 68.

It is thus possible to alter the hole to a hole to which the securing device 100 can be attached by processing the through-hole. In addition, the alteration of the through-hole can be performed on the outside member upper half 62 which is disposed while the device in which the annular member is provided is checked. Accordingly, it is possible to perform the alteration without interfering with other works. That is, it is possible to perform the alteration without influencing the entire work period. In addition, it is possible to form the through-hole 66 of the present embodiment even in a state where the through-hole is not formed in the outside member upper half 62.

In the securing device 100 of the present embodiment, even in a case where the axis of the first surface 67 of the through-hole 56 and the axis of the second surface 68 deviate from each other, it is possible to support the seal unit 104 by the cover member 106 so as not to be extracted while maintaining sealability of the seal unit 104. Accordingly, as shown in FIG. 5, even in a case where processing for connecting holes is performed and the axes of the holes deviate from each other in the process, it is possible to maintain the function of the securing device 100. Therefore, this eliminates the need for high-precision alignment of the axes of the holes and simplifies the processing.

Figure 13:
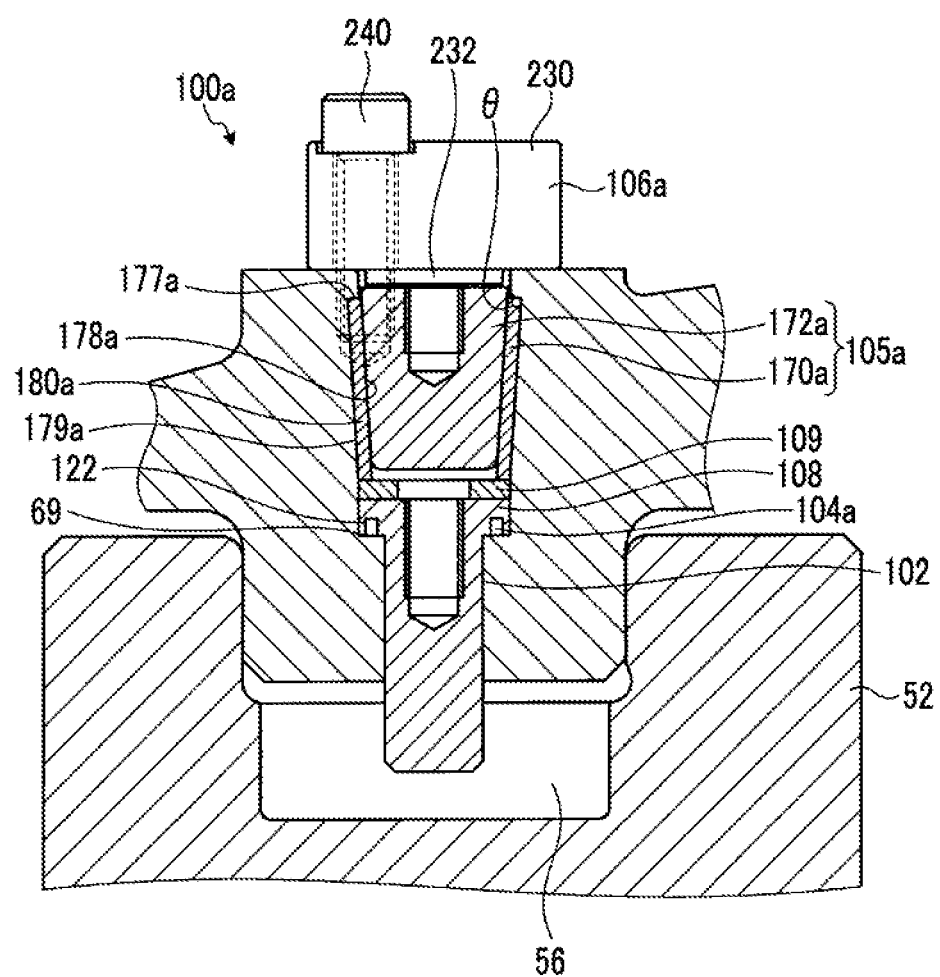
FIG. 13 is a schematic view showing a schematic configuration of another example of the securing device.
Figure 14:
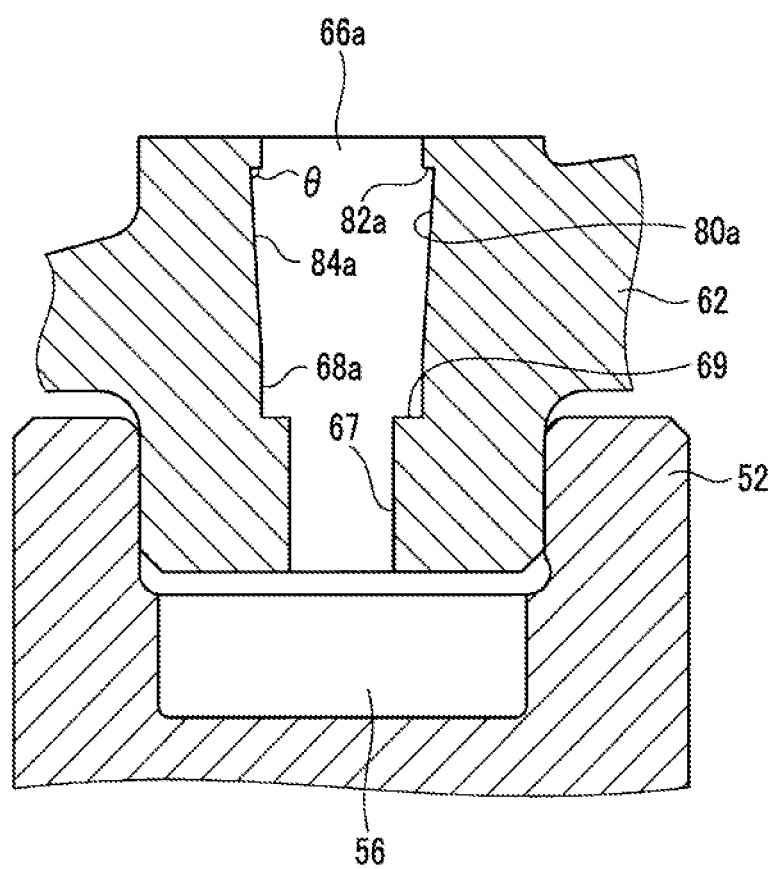
FIG. 14 is a sectional view showing a schematic configuration in a state where the securing device is removed from an outside member and an inside member.
Figure 15:
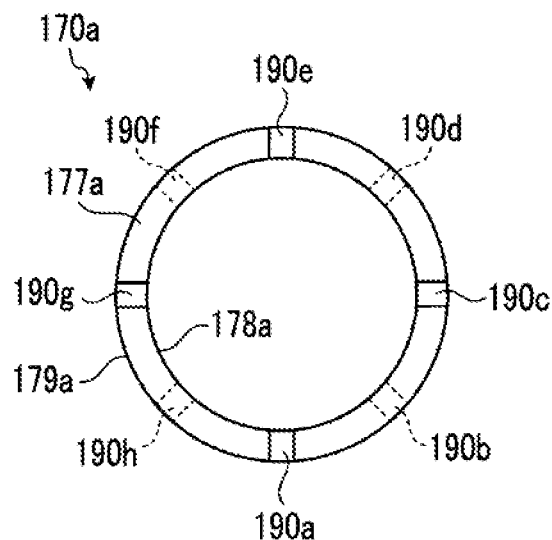
FIG. 15 is a top view showing a schematic configuration of a support sleeve of a pin support unit.
Figure 16:
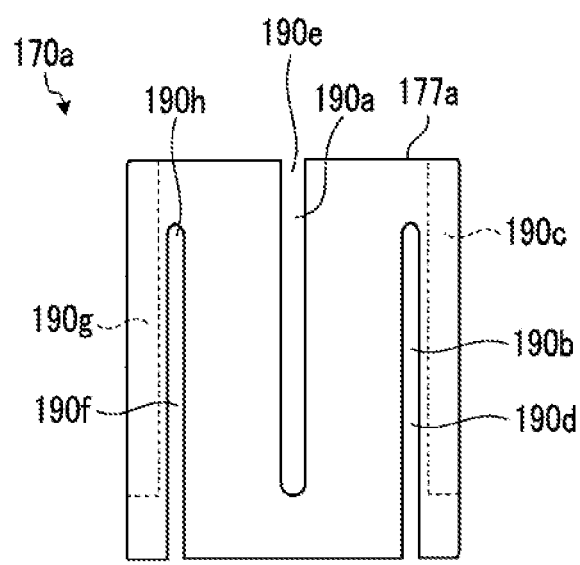
FIG. 16 is a front view showing a schematic configuration of the support sleeve of the pin support unit.
Figure 17:
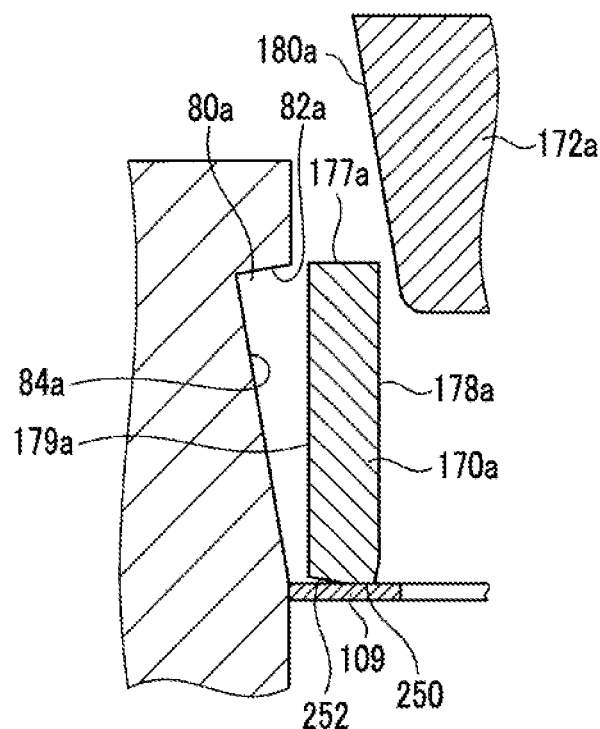
FIG. 17 is an explanatory view showing an example of a method for mounting the securing device.
Figure 18:
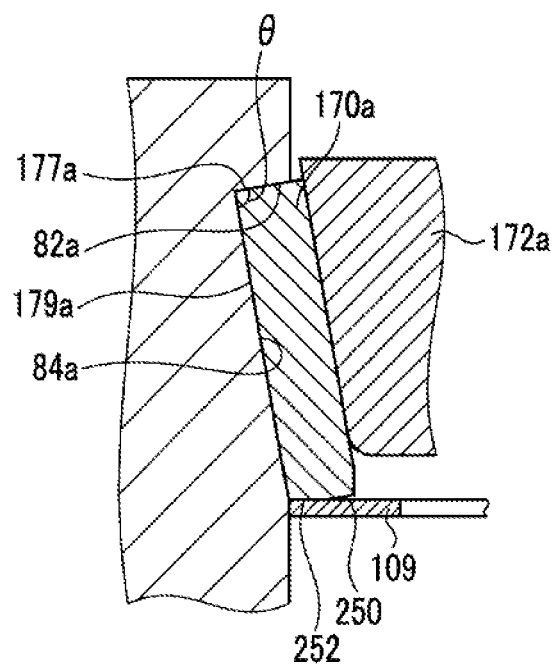
FIG. 18 is an explanatory view showing the example of the method for mounting the securing device.

Next, another example of the securing device will be described with reference to FIGS. 13 to 18. Among configurations of the securing device of another example, descriptions with respect to the configurations similar to those of the securing device 100 are omitted, and points specific to another example will be mainly described. FIG. 13 is a schematic view showing a schematic configuration of another example of the securing device. FIG. 14 is a sectional view showing a schematic configuration in a state where the securing device is removed from an outside member and an inside member. FIG. 15 is a top view showing a schematic configuration of a support sleeve of a pin support unit. FIG. 16 is a front view showing a schematic configuration of the support sleeve of the pin support unit. Each of FIGS. 17 and 18 is an explanatory view showing an example of a method for mounting the securing device.

A securing device 100a includes the radial pin 102, a seal unit 104a, a pin support unit 105a, a cover member 106a, and the liner 109 and is inserted into a through-hole 66a and the recess 56. The radial pin 102 and the liner 109 of the securing device 100a are configured to be similar to those of the securing device 100.

In the through-hole 66a of the present embodiment, a support unit insertion groove 80a is formed in the second surface 68 on the first surface 67 side from the position at which the screw groove 68a is formed. The support unit insertion groove 80a is a recess formed in the second surface 68 and is formed on the entire periphery of the through-hole 66a in the circumferential direction. The opening diameter of the support unit insertion groove 80a is larger than that of the portion of the second surface 68 adjacent to the support unit insertion groove 80a in the radial direction of the rotor. That is, an inner peripheral surface 84a of the support unit insertion groove 80a has a taper shape in which the diameter gradually increases toward the outside in the radial direction of the rotor in the radial direction of the rotor. The inner peripheral surface 84a is an inclination surface. In the support unit insertion groove 80a, the end portion on the outside in the radial direction of the rotor serves as a load receiving surface 82a facing the inside in the radial direction of the rotor. The load receiving surface 82a of the present embodiment is a surface orthogonal to the radial direction of the rotor. An angle θ between the load receiving surface 82a and a surface (peripheral surface, taper surface) on the inside of the load receiving surface 82a in the radial direction of the rotor is 90°.

The seal unit 104a is a seal ring and is disposed between the flange 122 of the radial pin 102 and the step portion 69. The seal unit 104a is inserted into a groove which is formed in the surface of the flange 122 on the step portion 69 side. The seal unit 104a seals a portion between the flange 122 and the step portion 69, and thus, seals a portion between the space of the through-hole 66a on the first surface 67 side and the space of the through-hole 66a on the second surface 68 side. The liner 109 is disposed between the radial pin 102 and the pin support unit 105a.

The pin support unit 105a includes a support sleeve 170a and a spacer 172a. The support sleeve 170a is formed in a cylindrical shape and has a taper shape in which diameters of an inner peripheral surface 178a and an outer peripheral surface 179a decrease toward the inside in the radial direction of the rotor. In the support sleeve 170a, the surface formed on the outside in the radial direction of the rotor senses as a load receiving surface 177a The load receiving surface 177a at least partially overlaps the load receiving surface 82a in the direction orthogonal to the axial direction of the through-hole (radial direction of the rotor). In the support sleeve 170a, the surface on the inside in the radial direction of the rotor faces the seal unit 104. The support sleeve 170a protrudes toward the inside in the radial direction from the support unit insertion groove 80a in the radial direction of the through-hole 66a and at least partially overlaps the liner 109.

As shown in FIGS. 15 and 16, the support sleeve 170a includes slits 190a, 190b, 190c, 190d, 190e, 190f, 190g, and 190h. The slits 190a, 190b, 190c, 190d, 190e, 190f, 190g, and 190h are disposed in this order in the circumferential direction of the cylindrical shape of the support sleeve 170a. The slit 190a and the slit 190h are adjacent to the each other. These slits are formed in the axial direction of the cylindrical shape of the support sleeve 170a and in the axial direction of the through-hole 66a. One end portion of each of the slits 190a, 190c, 190e, and 190g is open to the load receiving surface 177a and the other end portion is stopped halfway. One end portion of each of the slits 190b, 190d, 190f, and 190h is open to the surface opposite to the load receiving surface 177a and the other end portion is stopped halfway. That is, in the support sleeve 170a, the slits each having one end portion which is open to the load receiving surface 177a and the slits each having one end portion which is open to the surface opposite to the load receiving surface 177a are alternately formed in the circumferential direction of the cylindrical shape.

The spacer 172a is a columnar member. The spacer 172a is disposed on the outside of the support sleeve 170 in the radial direction of the rotor. The spacer 172a is formed in a columnar shape, and an outer peripheral surface 180a faces the arc-shaped portions 174. The spacer 172a has a taper shape in which the diameter of the outer peripheral surface 180a decreases toward the inside in the radial direction of the rotor. An inclination angle of the outer peripheral surface 180a with respect to the radial direction of the rotor is substantially the same as the inclination angle of the inner peripheral surface 178a of the support sleeve 170a with respect to the radial direction of the rotor. "Substantially the same" means that there is no difference between the angles other than errors occurring during manufacturing. In addition, the inclination angle of the outer peripheral surface 180a with respect to the radial direction may be different from the inclination angle of the inner peripheral surface 178a of the support sleeve 170a with respect to the radial direction. The surface of the spacer 172a on the outside in the radial direction of the rotor has a screw hole formed therein.

Here, a process of installing the pin support unit 105a will be described with reference to FIGS. 17 and 18. The securing device 100a can be assembled and manufactured by a process of installing the pin support unit 105a, and an assembly method and a manufacturing method for the securing device 100a. As shown in FIG. 17, the worker disposes the support sleeve 170a in the through-hole 66a in which the liner 109 is disposed. Here, in the end surface of the support sleeve 170a on the inside in the radial direction of the rotor, the side of the center of the through-hole 66a is a flat surface 250 parallel to the load receiving surface 177a, and the inner peripheral surface 84a side is an inclination surface 252 which is inclined with respect to the load receiving surface 177a. The inclination surface 252 is inclined in such a direction that a distance to the load receiving surface 177a decreases with a decreasing distance to the inner peripheral surface 84a. The flat surface 250 of the support sleeve 170a is in contact with the liner 109.

Next, the worker inserts the spacer 172a into the through-hole 66a. In the pin support unit 105a, the outer peripheral surface 180a of the spacer 172a is brought into contact with the inner peripheral surface 178a of the support sleeve 170a, and the spacer 172a is further pushed, so that the support sleeve 170a is expanded toward the outside in the radial direction of the through-hole 66a. If the support sleeve 170a is expanded, intervals between the slits 190a, 190b, 190c, 190d, 190e, 190f, 190g, and 190h of the support sleeve 170a are widened, and the support sleeve 170a is deformed toward the outside of the outer peripheral surface 179a in the radial direction of the through-hole 66a. Since the support sleeve 170a is deformed toward the outside in the radial direction of the through-hole 66a, as shown in FIG. 18, the pin support unit 105a is inserted into the support unit insertion groove 80a, the outer peripheral surface 179a of the support sleeve 170a and the inner peripheral surface 84a come into contact with each other, and the load receiving surface 177a and the load receiving surface 82a of the support unit insertion groove 80a overlap each other in the radial direction of the through-hole 66a. In addition, the end surface of the support sleeve 170a on the inside in the radial direction of the rotor is also deformed in conjunction with other portions, and the inclination surface 252 becomes the end surface on the liner 109 side. Accordingly, in a case where the liner 109 moves toward the outside in the radial direction of the rotor, the liner 109 comes into contact with the inclination surface 252. The inclination surface 252 is inclined with respect to the flat surface 250 at an angle which is the same as the inclination angle of the taper after the support sleeve 170a is deformed.

Next, the cover member 106a is secured to the outside member upper half 62 by a bolt 240. The cover member 106a includes a plate portion 230 which closes the through-hole 66a and a protrusion portion 232 which protrudes toward the through-hole 66a from the plate portion 230 and comes into contact with the spacer 172a. The plate portion 230 is larger than the through-hole 66a and closes the entire surface of the through-hole 66a. In the cover member 106a, the portion which is larger than the through-hole 66a of the plate portion 230 comes into contact with the surface of the outside member upper half 62 formed on the outside in the radial direction of the rotor. The bolt 240 is provided at the position at which the plate portion 230 is in contact with the outside member upper half 62 and is screwed to the screw hole provided in the outside member upper half 62. For example, in the cover member 106a, the bolts 240 are provided at four locations to surround the periphery of the protrusion portion 232.

In the securing device 100a, even when the support unit insertion groove 80a is formed in a taper shape, since the load receiving surface 82a facing the downside in the radial direction of the rotor is formed, even though a force is applied from the member on the downside in the radial direction of the rotor toward the outside in the radial direction of the rotor by the pin support unit 105a, the load receiving surface 177a can be supported by the load receiving surface 82a, and it is possible to prevent the securing device 100a from being extracted toward the outside in the radial direction of the rotor. Moreover, in the securing device 100a, even when the support sleeve 170a of the pin support unit 105a is formed of one member, since the slits 190a, 190b, 190c, 190d, 190e, 190f, 190g, and 190h are formed, the support sleeve 170a is configured to be easily deformed, and it is possible to insert the support sleeve 170a into the support unit insertion groove 80a.

Moreover, since the slits 190a, 190b, 190c, 190d, 190e, 190f, 190g, and 190h are formed to be parallel to each other in the axial direction of the cylinder of the support sleeve 170a and in the axial direction of the through-hole 66a, it is possible to easily deform the support sleeve 170a. In addition, in the support sleeve 170a, the open end surfaces (the surfaces on the ends in the axial direction) of the slits 190a, 190b, 190c, 190d, 190e, 190f, 190g, and 190h are alternately provided in the circumferential direction of the cylindrical shape, and thus, the support sleeve 170a can be formed to be easily deformed to the outside in the radial direction of the cylindrical shape.

Figure 19:
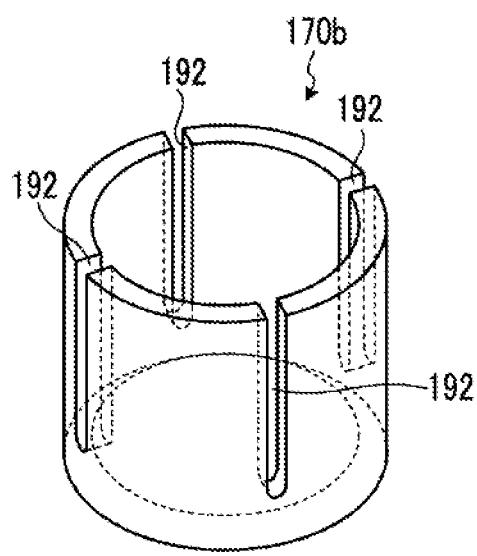
FIG. 19 is a perspective view showing a schematic configuration of a pin support unit of another example.

FIG. 19 is a perspective view showing a schematic configuration of a support sleeve of a pin support unit of still another example. In a support sleeve 170b shown in FIG. 19, a plurality of slits 192 are formed. In the plurality of slits 192, the same end portions are open to the end surface. In the support sleeve 170b, preferably, the slits 192 are open to the side facing the load receiving surface 82a. As shown in the support sleeve 170b, the slits may be configured to open to the same end surface.

In the securing member 100a, the support sleeve 170a is interposed between the support unit insertion groove 80a and the spacer 172a. Accordingly, it is possible to prevent deformation such as buckling (swelling) of the support sleeve 170a. Moreover, a compressive force in the radial direction of the rotor can be easily applied to the support sleeve 170a and bending deformation does not easily occur.

Moreover, in the securing device 100a, it is possible to adjust the position of the support sleeve 170a by the liner 109. Moreover, in the securing device 100a, since the inclination surface 252 is provided on a portion of the surface of the support sleeve 170a on the inside in the radial direction of the rotor, the support sleeve 170a can be brought into close contact with the support unit insertion groove 80a. Accordingly, the support sleeve 170a can be brought into closer contact with the liner 109 and the support unit insertion groove 80a, and thus, it is possible to easily transfer only the compressive force.

In the securing device 100a, since the angle θ between the load receiving surface 82a and the surface (peripheral surface, taper surface) on the lower side of the load receiving surface 82a in the radial direction of the rotor is set to 90°, the load receiving surface 82a and the load receiving surface 177a can be more reliably brought into contact with each other. Accordingly, preferably, the angle θ is 90°. However, the angle θ may be angles other than 90°.

Moreover, in the securing device 100a, the screw hole is not provided in the through-hole 66a, and the securing device 100a is secured to the outside member upper half 62 by the bolts 240. In this way, the cover member 106a may be secured to the outside member upper half 62 using the bolts 240. In the securing device 100a, when the cover member 106a is viewed from the outside in the radial direction of the rotor, since the cover member 106a is formed in a substantially rectangular shape having short sides and long sides, it is possible to install the securing device 100a even in a case where the attachment space of the cover member is narrow.

Here, the number of the bolts 240 in the case where the cover member is fastened by the bolts 240 is not particularly limited. For example, in the cover member 106a, the bolts 240 may be provided at six locations so as to surround the periphery of the protrusion portion 232. By increasing the number of the bolts 240 in the cover member 106a, the size of the securing device increases. However, it is possible to more reliably secure the cover member 106a to the outside member upper half 62.

Figure 20:
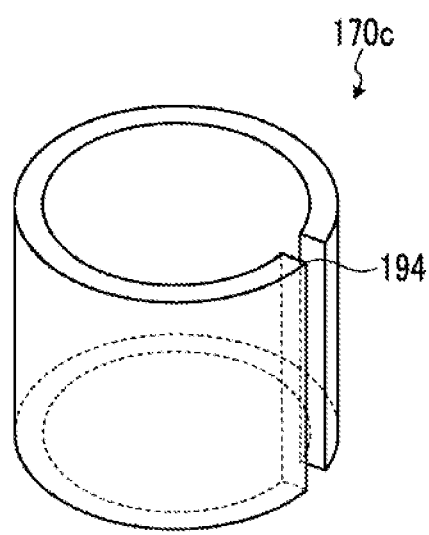
FIG. 20 is a perspective view showing a schematic configuration of a pin support unit of still another example.

FIG. 20 is a perspective view showing a schematic configuration of a support sleeve of a pin support unit of still another example. In a support sleeve 170c shown in FIG. 20, an opening 194 is formed in a portion of the cross section of the cylindrical shape, and the cross section is formed in a C shape. The opening formed in the support sleeve 170c is formed from one end portion of the cylindrical shape in the axial direction to the other end portion. In this way, even when the cross section of the support sleeve 170c is formed in a C shape, similarly to the support sleeve 170a, it is possible to expand the support sleeve 170c toward the outside in the radial direction of the cylindrical shape by the spacer 172a, and it is possible to deform the support sleeve 170c toward the outside in the radial direction of the cylindrical shape. In addition, in the case where the structure of the support sleeve 170c is adopted, the support sleeve 170c may be inserted into the through-hole 66a in a state of being compressed and deformed, and the support sleeve 170c may be deformed toward the outside in the radial direction by a restoring force when the support sleeve 170c reaches the support unit insertion groove 80a. In this way, in the pin support unit, in the case where the support sleeve 170c is inserted into the support unit insertion groove 80a by the restoring force, the spacer may not be provided.

In addition, in the above-described embodiments, the securing device 100 is provided at the highest position in the rotation direction of the rotor, that is, on the upper end portion in the vertical direction. However, the present invention is not limited to this. The securing device 100 may be provided at any position in the rotation direction of the rotor 16. For example, the securing device may be installed at the lowest position of the outside member, that is, in the through-hole in the lower end portion in the vertical direction. That is, the above-described securing device may be provided in the outside member lower half. Even in a case where the securing device is provided in the outside member lower half, it is possible to use the above-described securing device mounting method and it is possible to use the rotary machine manufacturing method and the rotary machine assembly method.

REFERENCE SIGNS LIST

- 10: steam turbine
- 16: rotor
- 20: circumferential direction (rotation direction)
- 30: blade
- 34: inner casing
- 36: outer casing
- 40: steam inlet
- 42: vane
- 50: annular member
- 51: inside member
- 52: inside member upper half
- 54: inside member lower half
- 56: recess
- 57: groove
- 60: outside member
- 62: outside member upper half
- 64: outside member lower half
- 65: protrusion
- 66, 66a: through-hole
- 67: first surface
- 68: second surface
- 68a: screw groove
- 69: step portion
- 70: securing unit
- 72: outside member securing device
- 80, 80a: support unit insertion groove
- 82, 82a: load receiving surface
- 100, 100a: securing device
- 102: radial pin
- 104: seal unit
- 105, 105: pin support unit
- 106, 106a: cover member
- 108: liner
- 112: seal sleeve
- 114: seal insertion member
- 121: outer peripheral surface
- 122: flange
- 124: screw hole
- 126: notch surface
- 130: inner peripheral surface
- 140: outer peripheral surface
- 142: screw hole
- 150: cylindrical hole
- 162: outer peripheral surface
- 164: hexagonal groove
- 170, 170a: support sleeve
- 172, 172a: spacer
- 173: split sleeve
- 174: arc-shaped portion
- 176: extension portion
- 177, 177a: load receiving surface
- 178, 178a: inner peripheral surface
- 179, 179a: outer peripheral surface
- 180, 180a: outer peripheral surface
- 190a, 190b, 190c, 190d, 190e, 190f, 190g, 190h: slit

The invention claimed is:

1. A securing device which secures a relative position in a circumferential direction of an outside member and an inside member of a stationary body of a rotary machine, the securing device comprising:

a radial pin which is inserted into a through-hole having an outside hole and an inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, the radial pin having a portion on the inside in the radial direction of the rotary machine inserted into a recess formed in the inside member, and including a flange portion having an outer diameter larger than a diameter of the inside hole; and a pin support unit which is inserted into the outside hole on the outside in the radial direction of the rotary machine, and is configured such that a surface formed on the outside in the radial direction of the rotary machine overlaps, in a radial direction of the through-hole, a surface which is formed on the outside hole and faces the inside in the radial direction of the rotary machine, and such that the pin support unit overlaps the radial pin in the radial direction of the through-hole, wherein the pin support unit includes a support sleeve having a surface formed on the outside in the radial direction of the rotary machine, and a spacer which is disposed inside the support sleeve and is in contact with an inner peripheral surface of the support sleeve, and wherein the support sleeve includes a plurality of split sleeves which are divided in a circumferential direction of the through-hole.

2. The securing device according to claim 1, wherein a support unit insertion groove recessed in a radial direction of the outside hole is formed in an inner peripheral surface of the outside hole, wherein a surface facing the inside in the radial direction of the rotary machine is formed on the outside of the support unit insertion groove in the radial direction of the rotary machine, and wherein the surface facing the inside in the radial direction of the rotary machine is in contact with the surface of the support sleeve formed on the outside in the radial direction of the rotary machine, and the outer peripheral surface of the support sleeve is in contact with the support unit insertion groove.

3. The securing device according to claim 2, wherein in the support unit insertion groove, a surface which is in contact with the outer peripheral surface of the support sleeve and is perpendicular to the radial direction of the outside hole and a surface which faces the surface facing the inside in the radial direction of the rotary machine are formed.

4. The securing device according to claim 2, wherein in the support unit insertion groove, a surface which is in contact with the outer peripheral surface of the support sleeve and extends farther toward the inside in the radial direction of the outside hole as the surface extends from the outside in the radial direction of the rotary machine toward the inside in the radial direction thereof is formed.

5. The securing device according to claim 1, further comprising a cover member which is disposed on the outside of the pin support unit in the radial direction of the rotary machine and is secured to the outside member.

6. The securing device according to claim 1,
wherein the outer peripheral surface of the support sleeve is perpendicular to the surface of the outside hole facing the inside in the radial direction of the rotary machine.

7. The securing device according to claim 1, further comprising a liner which is disposed between the pin support unit and the radial pin and is in contact with the pin support unit.

8. The securing device according to claim 1, further comprising a seal unit which is inserted into the through-hole and seals the through-hole on the inside of the pin support unit in the radial direction of the rotary machine.

9. The securing device according to claim 8,
wherein the seal unit includes a seal sleeve in which a diameter of an inner peripheral surface is changed in the radial direction of the rotary machine and a columnar insertion member which is inserted into the seal sleeve and is in contact with the inner peripheral surface of the seal sleeve, and
wherein an outer peripheral surface of the seal sleeve is in contact with the through-hole and the inner peripheral surface of the seal sleeve and the insertion member are in contact with each other.

10. A steam turbine, comprising:
the securing device according to claim 1;
the outside member;
the inside member; and
a rotary body which is disposed on the inside of the inside member in the radial direction of the rotary machine.

11. A rotary machine manufacturing method for manufacturing a rotary machine by securing a relative position in a circumferential direction of an outside member and an inside member of a stationary body of the rotary machine, the method comprising:
a step of inserting a radial pin including a flange portion having an outer diameter larger than a diameter of an inside hole into a through-hole having an outside hole and the inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, and of inserting an end portion of the radial pin on the inside in the radial direction of the rotary machine into a recess which is formed in the inside member disposed on the inside of the outside member in the radial direction of the rotary machine; and
a pin support unit installation step of inserting a pin support unit into the outside hole on the outside in the radial direction of the rotary machine, causing the pin support unit and the radial pin to overlap each other in a radial direction of the through-hole, and causing a surface of the pin support unit formed on the outside in the radial direction of the rotary machine and a surface which is formed on the outside hole and faces the inside in the radial direction of the rotary machine to overlap each other in the radial direction of the through-hole,
wherein the pin support unit includes a support sleeve having a surface formed on the outside in the radial direction of the rotary machine, and a spacer which is disposed inside the support sleeve and is in contact with an inner peripheral surface of the support sleeve, and
wherein the support sleeve includes a plurality of split sleeves which are divided in a circumferential direction of the through-hole.

12. The rotary machine manufacturing method according to claim 11,
wherein the pin support unit includes a support sleeve having a surface formed on the outside in the radial direction of the rotary machine and a spacer which is inserted into the support sleeve, and
wherein the pin support unit installation step includes a step of disposing a surface of the support sleeve formed on the outside in the radial direction of the rotary machine at a position at which the surface is in contact with the surface of the outside hole facing the inside in the radial direction of the rotary machine, and a step of inserting the spacer into the support sleeve.

13. The rotary machine manufacturing method according to claim 11,
wherein the pin support unit includes a support sleeve having a surface formed on the outside in the radial direction of the rotary machine and a spacer which is inserted into the support sleeve, and
wherein the pin support unit installation step includes a step of disposing the support sleeve in the outside hole, and a step of inserting the spacer into the support sleeve, moving the support sleeve to the outside in the radial direction of the through-hole, and moving a surface of the support sleeve formed on the outside in the radial direction of the rotary machine to a position at which the surface is in contact with the surface of the outside hole facing the inside in the radial direction of the rotary machine.

14. A rotary machine assembly method for manufacturing a rotary machine by securing a relative position in a circumferential direction of an outside member and an inside member of a stationary body of the rotary machine, the method comprising:
a step of inserting a radial pin including a flange portion having an outer diameter larger than a diameter of an inside hole into a through-hole having an outside hole and the inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, and of inserting an end portion of the radial pin on the inside in the radial direction of the rotary machine into a recess which is formed in the inside member disposed on the inside of the outside member in the radial direction of the rotary machine; and
a pin support unit installation step of inserting a pin support unit into the outside hole on the outside in the radial direction of the rotary machine, causing the pin support unit and the radial pin to overlap each other in a radial direction of the through-hole, and causing a surface of the pin support unit formed on the outside in the radial direction of the rotary machine and a surface which is formed on the outside hole and faces the inside in the radial direction of the rotary machine to overlap each other in the radial direction of the through-hole, wherein the pin support unit includes a support sleeve having a surface formed on the outside in the radial direction of the rotary machine, and a spacer which is disposed inside the support sleeve and is in contact with an inner peripheral surface of the support sleeve, wherein the support sleeve has a cylindrical shape in which slits are formed, and wherein the spacer has a shape in which a diameter of the spacer gradually decreases from the outside in the radial direction of the rotary machine toward the inside in the radial direction thereof.

15. A securing device which secures a relative position in a circumferential direction of an outside member and an inside member of a stationary body of a rotary machine, the securing device comprising:

a radial pin which is inserted into a through-hole having an outside hole and an inside hole and penetrating the outside member in a radial direction of the rotary machine, the outside hole being open to an outside of the outside member in the radial direction of the rotary machine, the inside hole communicating with the outside hole, having a smaller diameter than the outside hole, and being open to an inside in the radial direction of the rotary machine, the radial pin having a portion on the inside in the radial direction of the rotary machine inserted into a recess formed in the inside member, and including a flange portion having an outer diameter larger than a diameter of the inside hole; and a pin support unit which is inserted into the outside hole on the outside in the radial direction of the rotary machine, and is configured such that a surface formed on the outside in the radial direction of the rotary machine overlaps, in a radial direction of the through-hole, a surface which is formed on the outside hole and faces the inside in the radial direction of the rotary machine, and such that the pin support unit overlaps the radial pin in the radial direction of the through-hole, wherein the pin support unit includes a support sleeve having a surface formed on the outside in the radial direction of the rotary machine, and a spacer which is disposed inside the support sleeve and is in contact with an inner peripheral surface of the support sleeve, wherein the support sleeve has a cylindrical shape in which slits are formed, and wherein the spacer has a shape in which a diameter of the spacer gradually decreases from the outside in the radial direction of the rotary machine toward the inside in the radial direction thereof.

16. The securing device according to claim 15, wherein the slits are formed in the radial direction of the rotary machine from an end surface of the support sleeve on the outside in the radial direction of the rotary machine or an end surface of the support sleeve on the inside in the radial direction thereof.

17. The securing device according to claim 15, wherein a support unit insertion groove recessed in a radial direction of the outside hole is formed in an inner peripheral surface of the outside hole, wherein a surface facing the inside in the radial direction of the rotary machine is formed on the outside of the support unit insertion groove in the radial direction of the rotary machine, and wherein the surface facing the inside in the radial direction of the rotary machine is in contact with the surface of the support sleeve formed on the outside in the radial direction of the rotary machine, and the outer peripheral surface of the support sleeve is in contact with the support unit insertion groove.

18. The securing device according to claim 17, wherein in the support unit insertion groove, a surface which is in contact with the outer peripheral surface of the support sleeve and is perpendicular to the radial direction of the outside hole and a surface which faces the surface facing the inside in the radial direction of the rotary machine are formed.

19. The securing device according to claim 17, wherein in the support unit insertion groove, a surface which is in contact with the outer peripheral surface of the support sleeve and extends farther toward the inside in the radial direction of the outside hole as the surface extends from the outside in the radial direction of the rotary machine toward the inside in the radial direction thereof is formed.

20. The securing device according to claim 15, further comprising a cover member which is disposed on the outside of the pin support unit in the radial direction of the rotary machine and is secured to the outside member.

21. The securing device according to claim 15, wherein the outer peripheral surface of the support sleeve is perpendicular to the surface of the outside hole facing the inside in the radial direction of the rotary machine.

22. The securing device according to claim 15, further comprising a liner which is disposed between the pin support unit and the radial pin and is in contact with the pin support unit.

23. The securing device according to claim 15, further comprising a seal unit which is inserted into the through-hole and seals the through-hole on the inside of the pin support unit in the radial direction of the rotary machine.

24. The securing device according to claim 23, wherein the seal unit includes a seal sleeve in which a diameter of an inner peripheral surface is changed in the radial direction of the rotary machine and a columnar insertion member which is inserted into the seal sleeve and is in contact with the inner peripheral surface of the seal sleeve, and wherein an outer peripheral surface of the seal sleeve is in contact with the through-hole and the inner peripheral surface of the seal sleeve and the insertion member are in contact with each other.

25. A steam turbine, comprising:

the securing device according to claim 15;

the outside member;

the inside member; and a rotary body which is disposed on the inside of the inside member in the radial direction of the rotary machine.

* * * * *